(12) United States Patent
Bankart et al.

(10) Patent No.: US 6,609,419 B1
(45) Date of Patent: Aug. 26, 2003

(54) SIGNAL TRANSMISSION IN A TIRE PRESSURE SENSING SYSTEM

(75) Inventors: Adrian Edmund Bankart, London (GB); Sarah Catherine Bradshaw, London (GB)

(73) Assignee: Emtop Limited, London (GB)

( * ) Notice: Subject to any disclaimer, the term of this patent is extended or adjusted under 35 U.S.C. 154(b) by 0 days.

(21) Appl. No.: 09/913,019

(22) PCT Filed: Feb. 11, 2000

(86) PCT No.: PCT/GB00/00450

§ 371 (c)(1), (2), (4) Date: Aug. 9, 2001

(87) PCT Pub. No.: WO00/47429

PCT Pub. Date: Aug. 17, 2000

(30) Foreign Application Priority Data

Feb. 11, 1999 (GB) .............................. 9903114

(51) Int. Cl.$^7$ .............................................. B60C 23/02
(52) U.S. Cl. .................. 73/146.5; 73/146; 340/447; 200/61.22
(58) Field of Search ............... 73/146.5, 115, 73/706, 724; 606/151; 340/447, 572, 572.1, 448, 658, 539; 200/61.22; 324/318

(56) References Cited

U.S. PATENT DOCUMENTS

| 4,006,449 A | | 2/1977 | Sumi |
|---|---|---|---|
| 4,072,927 A | | 2/1978 | O'Neil |
| 4,254,398 A | | 3/1981 | Matsuda et al. |
| 4,311,053 A | * | 1/1982 | Cucci ........................ 73/704 |
| 4,334,428 A | | 6/1982 | Fima et al. |
| 4,376,931 A | * | 3/1983 | Komatu et al. ............... 340/58 |
| 4,467,641 A | | 8/1984 | Abraham |
| 4,529,961 A | * | 7/1985 | Nishimura et al. .......... 340/58 |
| 4,567,459 A | | 1/1986 | Folger et al. |
| 4,597,286 A | | 7/1986 | Aguglia |
| 5,033,295 A | | 7/1991 | Schmid et al. |
| 5,181,423 A | | 1/1993 | Philipps et al. |
| 5,841,122 A | | 11/1998 | Kirchhoff |
| 5,892,411 A | | 4/1999 | Schwan et al. |
| 6,362,738 B1 | * | 3/2002 | Vega ........................ 340/572.1 |

FOREIGN PATENT DOCUMENTS

DE   32 03 880   11/1982

(List continued on next page.)

OTHER PUBLICATIONS

VDI Berichte NR. 819, 1990; Ulke et al.; "Electronic Tyre Pressure Control System"; With translation.

*Primary Examiner*—Andrew H. Hirshfeld
*Assistant Examiner*—Marissa Ferguson
(74) *Attorney, Agent, or Firm*—Larson & Taylor, PLC

(57) ABSTRACT

Signal transmission apparatus for use, for example, in a passive sensor system such as an in-vehicle tyre pressure sensing system, comprises transmitter circuitry and receiver circuitry coupled together by a coupling, preferably a wireless coupling such as two opposed plate-form antennae. The transmitter circuitry includes a resonator having at least one component whose value influences a natural resonant frequency of the resonator and can be changed in use of the circuitry. The effective value is changed, for example, by a physical parameter being sensed or by a control signal to be transmitted. The receiver circuitry includes a driver section for applying to the resonator an excitation signal having a predetermined excitation frequency that is different from the natural resonant frequency. The transmitter circuitry preferably derives its power supply from the excitation signal via a rectifier circuit. The receiver circuitry detects such a change in the effective value via the coupling. Such signal transmission apparatus can operate accurately and reliably in electronically and environmentally inhospitable environments.

22 Claims, 14 Drawing Sheets

FOREIGN PATENT DOCUMENTS

| | | |
|---|---|---|
| EP | 0 341 226 | 11/1989 |
| EP | 0 450 653 | 10/1991 |
| EP | 0 641 092 | 7/1994 |
| EP | 0 665 656 | 1/1995 |
| EP | 0 636 502 | 2/1995 |
| EP | 0 657 836 | 5/1995 |
| EP | 0 712 105 | 5/1996 |
| GB | 2 065 896 | 7/1981 |
| GB | 2 069 209 | 8/1981 |
| GB | 2 252 479 | 8/1992 |
| GB | 0640734 | 10/1998 |
| GB | 0695652 | 12/1998 |
| WO | WO 86/00265 | 1/1986 |
| WO | WO 87/03544 | 6/1987 |
| WO | WO 92/13730 | 8/1992 |
| WO | WO 94/20941 | 9/1994 |
| WO | WO 95/07521 | 3/1995 |
| WO | WO 96/06747 | 3/1996 |
| WO | WO 96/16418 | 5/1996 |
| WO | WO 97/45277 | 12/1997 |

* cited by examiner

EXCITER
VOLTAGE
5V P-P

SENSOR
OSCILLATOR
OUTPUT
VOLTAGE 3V p-p

RESONATOR
VOLTAGE 3V p-p

SOURCE
IMPEDANCE
VOLTAGE 3V p-p

DETECTOR
VOLTAGE

AMPLIFIER
OUTPUT
VOLTAGE

SQUARER
OUTPUT
VOLTAGE 5V P-P

RELAY   100mA
MODULE
CURRENT  40mA

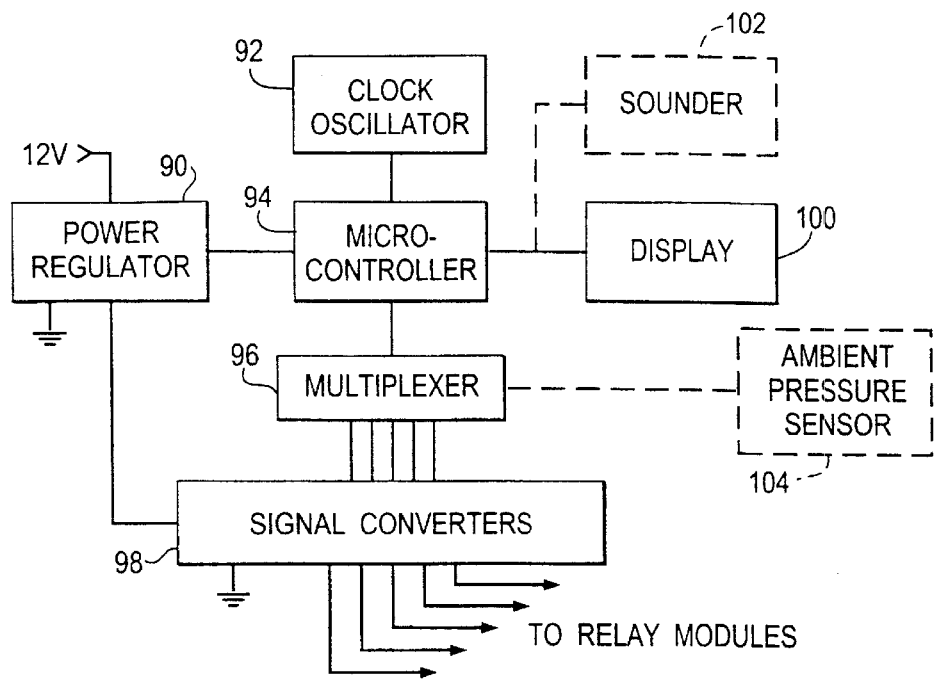
Fig.13
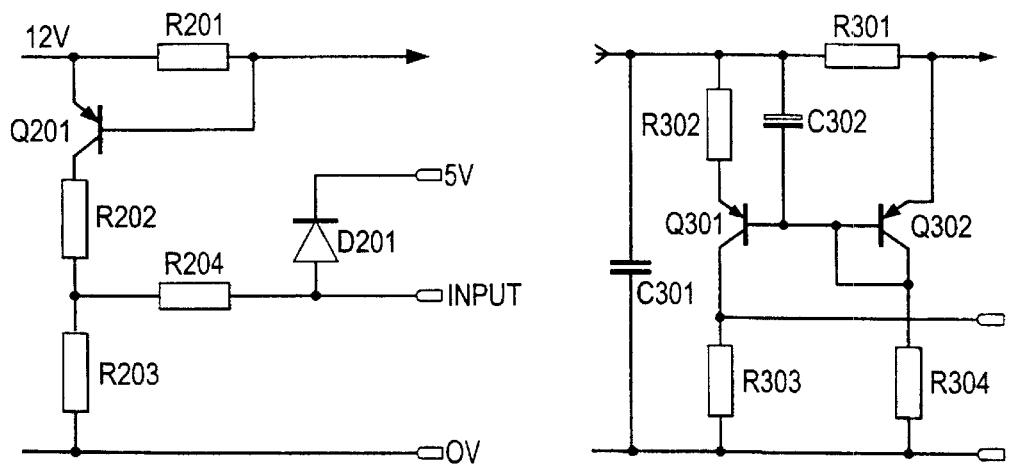
Fig.14
Fig.15

SIGNAL TRANSMISSION IN A TIRE PRESSURE SENSING SYSTEM

BACKGROUND OF THE INVENTION

1. Field of the Invention

The present invention relates to signal transmission, and in particular but not exclusively to wireless signal transmission. Such wireless signal transmission is required, for example, in sensor systems for use with two elements that are movable relative to one another, a sensor on one of the two elements transmitting its sensor data to, and preferably being supplied with power from, a receiver on the other element. For example, one embodiment of the present invention is intended for use in a pressure sensor system on a vehicle to measure tyre pressure.

2. Description of the Related Art

The key problem of in-vehicle tyre pressure measurement stems from the fact that the wheels and tyres rotate relative to the vehicle. Sensed information has to be passed from the moving wheel. Wheels and tyres must still be interchangeable by users and garages and any failures must have safe consequences. Furthermore, tyre pressures must be sensed accurately and reliably, and the sensed information must be converted into a suitable form of signal which is transmitted via a suitable link provided at each wheel. The information must be conveyed to the dashboard and converted into a form suitable for display. An overall accuracy of about ±2% should desirably be maintained. In addition, the complete system must be implemented within certain constraints of size and weight to operate in the electronically and environmentally inhospitable environment of the vehicle. To be applicable to mass-market vehicles the system must also be cheap.

Tyre pressures vary significantly with ambient conditions. This means that a measurement of absolute pressure alone is insufficiently accurate to verify that the tyre is correctly inflated. Even a measure of pressure relative to atmospheric pressure is insufficient if the air in the tyre is hot from use. It is therefore also desirable to measure the air temperature in the tyre and to make allowances for this to establish that the tyre inflation is correct.

In one commercially available tyre pressure measurement system, a battery, sensors and a radio transmitter are provided within each tyre on the vehicle, and the vehicle carries a central radio receiving station to interpret and display the data. The transmitters in the wheels are activated by vehicle motion, and each has a coded signature so that it can be identified and transmits its data to the central receiving station where it is interpreted for display. The system can relay both pressure and temperature information. This system, however, has a large number of drawbacks. It is complex and expensive; it requires maintenance of the batteries in the wheels; it uses radio for transmission which is pervasive and has electro-magnetic coupling (EMC) pollution problems at high vehicle density; the system must be reconfigured and recoded if the wheel is moved to a different position; and it does not operate until the wheel is turning and therefore does not operate on spare wheels or stationary vehicles.

Another existing measurement system uses concentric close-coupled transformers on the vehicle axles, and transmits power to the sensors and circuitry in the wheels and multiplexes (times slices) this with information transmitted from the wheels. Each transformer is connected by cable to a central module which controls the system and decodes the information for display. The system is designed primarily for heavy commercial vehicles and will relay both pressure and temperature data.

This system is also undesirably complex and requires that the coupling transformers are incorporated at the vehicle design stage as they must be concentric with the axles; it is complex electronically because of the time slicing; additional connections must be made to a wheel when it is fitted and, while it is acceptable on heavy commercial vehicles, it is problematic on cars.

Another system employs a simple go/no-go sensor in each wheel which changes its characteristic resonant frequency to indicate the change of state. Each sensor is activated by an electromagnetic pulse and its echo is monitored. This system, although simple, offers limited performance. The go/no-go threshold is intrinsic to the sensor and therefore the sensor has to be changed if a different threshold is required, for example if a wheel is to be moved from one axle to another or if a high load is to be carried. The system cannot detect over-pressure, nor is it readily adaptable to multi-wheel axles.

A number of other systems exist which also incorporate tyre re-inflation mechanisms. These are inevitably costly and complicated. Some systems are available which measure other parameters, such as axial height or rolling tyre circumference, to give an indication of the tyre inflation. These other parameters do not easily relate to the tyre manufacturer's specifications.

Various attempts have been made to provide signal transmission apparatus, adapted for use in tyre pressure sensing applications, in which a wheel-side resonator is coupled inductively to a vehicle-side circuit that applies an excitation signal to the wheel-side resonator. The wheel-side resonator has at least one component whose effective value influences a natural resonant frequency of the resonator and is changed in use of the apparatus as the tyre pressure changes.

These various attempts have in common the feature that the wheel-side resonator and vehicle-side circuit together form a variable-frequency oscillator circuit whose frequency of oscillation (the excitation frequency) varies with variations in the effective value of the variable resonator component. The excitation frequency is then simply equal to the instantaneous resonant frequency of the entire oscillator circuit. The excitation frequency is then generally measured using a frequency meter or the like to produce a tyre pressure indication. WO-A-87/03544 and GB-A-2065896 disclose examples of this kind of apparatus.

In another example, disclosed in DE-A-3203880, a variable-frequency oscillator circuit is formed involving the wheel-side resonator, but in this case the wheel-side resonator serves to damp oscillations in the vehicle-side circuit. When the tyre pressure is at a desired normal value the vehicle-side circuit is maximally damped by the wheel-side resonator and no oscillations take place in the vehicle-side circuit. As the tyre pressure falls below the normal value the effective value of the resonator variable component changes and the excitation frequency changes accordingly. This change in the excitation frequency is accompanied by a reduction in the damping effect so that oscillations take place in the vehicle-side circuit. The amplitude of these oscillations is measured to provide an indication of tyre pressure. These examples suffer from the disadvantage that the excitation frequency may be influenced significantly by other factors unrelated to the change in effective value, so that in many practical applications, especially involving the inhospitable environment of a vehicle, excitation-frequency changes (or damping changes) may not be sufficiently reliable to use for signal transmission purposes.

There are some examples of apparatus in which the excitation frequency is not made to vary with changes in the effective value of the resonator variable component but in these examples the excitation signal does not serve to bring about in the wheel-side resonator oscillations that have the predetermined excitation frequency of the excitation signal itself. These examples rely on applying excitation pulses at predetermined intervals to the wheel-side resonator so as to excite the resonator into oscillation at its instantaneous resonant frequency (which is dependent on the effective value of the resonator variable component). The frequency of the resonator oscillations (an echo signal) is then measured in the quiet periods between excitation pulses. Examples of such echo-based apparatus are disclosed in EP-A-0636502 and WO-A-87/03544. The echo-based examples require a complex time-multiplexing design to generate the excitation pulses in a transmission phase and to detect the echo signal in a separate reception phase, and the echo signal tends to be undesirably weak as the wheel-side resonator can only be excited intermittently.

BRIEF SUMMARY OF THE INVENTION

According to a first aspect of the present invention there is provided signal transmission apparatus comprising: transmitter circuitry including resonator means having at least one component whose effective value influences a natural resonant frequency of the resonator means and can be changed in use of the circuitry; excitation means for applying to the resonator means an excitation signal having an excitation frequency, said excitation signal serving to bring about oscillations having said excitation frequency in said resonator means; and coupling means for providing a coupling between the said resonator means and receiver circuitry of the apparatus, the receiver circuitry being operable to detect such a change in the said effective value via the said coupling;

characterised in that said excitation frequency is a predetermined excitation frequency that does not change when said effective value changes and that differs from each value of said natural resonant frequency of said resonator means as said effective value changes in use of the transmitter circuitry.

According to a second aspect of the present invention there is provided sensing apparatus, for transmitting sensor data from a first element to a second element, the first and second elements being movable relative to one another, which apparatus includes signal transmission apparatus embodying the aforesaid first aspect of the present invention; the said transmitting circuitry being adapted to be carried by the first element and comprising sensor means for sensing one or more predetermined parameters, the said change in the said effective value being brought about by a change in at least one of the said predetermined parameters; and the said receiving circuitry being adapted to be carried by the second element.

According to a third aspect of the present invention there is provided tyre pressure measuring apparatus, adapted to be carried by a vehicle, including signal transmission apparatus, embodying the aforesaid first aspect of the present invention, wherein the said transmitter circuitry comprises sensor means for sensing one or more predetermined parameters, and the said change in the said effective value is brought about by a change in at least one of the said predetermined parameters.

According to a fourth aspect of the present invention there is provided a signal transmission method, for use with transmitter circuitry that includes resonator means having at least one component whose effective value influences a natural resonant frequency of the resonator means, and with receiver circuitry that has a coupling when in use to the said resonator means, the method comprising: applying to the resonator means an excitation signal having an excitation frequency so that oscillations having said excitation frequency are brought about in said resonator means; bringing about a change in the said effective value of the said one component in the transmitter circuitry; and detecting such a change in the said effective value in the receiver circuitry via the said coupling; characterised in that said excitation frequency is a predetermined excitation frequency that does not change when said effective value changes and that differs from each value of said natural resonant frequency of said resonator means as said effective value changes in use of the transmitter circuitry.

BRIEF DESCRIPTION OF THE DRAWINGS

FIG. 13 shows a block circuit diagram of a display module included in the FIG. 1 apparatus;

FIG. 14 shows an example of a signal converter circuit included in the FIG. 13 display module;

FIG. 15 shows an optional additional part of the signal converter circuit of FIG. 14;

DETAILED DESCRIPTION OF THE PREFERRED EMBODIMENTS

Figure 1:
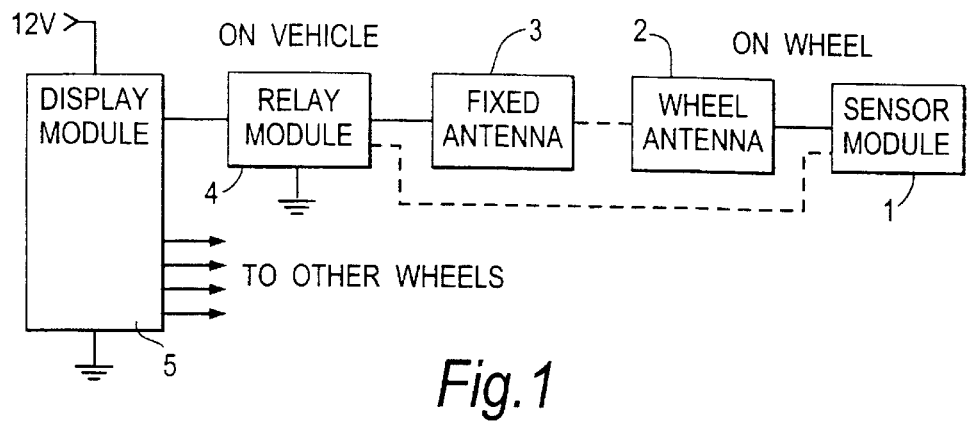
FIG. 1 shows a block diagram of tyre pressure measurement apparatus embodying the present invention.

As shown in the block diagram of FIG. 1, tyre pressure measurement apparatus embodying the present invention comprises five principal elements: a sensor module 1, a wheel antenna 2, a fixed antenna 3, a relay module 4 and a display module 5. The sensor module 1, wheel antenna 2, fixed antenna 3 and relay module 4 are provided on a per-wheel basis; the display module 5 is provided in common for all wheels. The sensor module 1 and wheel antenna 2 are mounted on the relevant wheel and the fixed antenna 3, relay module 4 and display module 5 are carried by the vehicle.

The sensor module 1 is mounted on a particular wheel. Preferably, the module is arranged in the well of the wheel rim, but alternatively the module can be arranged externally of the tyre with pressure and thermal connections to the air contained in the tyre. The sensor module contains sensors that respond to pressure and temperature, as well as circuitry for producing one or more signals whose frequency is a function of pressure and temperature. The sensor module also includes load circuitry, in the form of a resonator, whose impedance varies according to the signals produced, and means for deriving a power supply from the load.

The relay module 4, which is coupled reactively to the sensor module by the antennae 2 and 3, serves to drive the load circuitry in sensor module and to detect the variation in loading and convert this variation into a signal suitable for use by the display module 5. The relay module can be mounted either on the axle, close to or as part of the fixed antenna 3, or in the dashboard.

The relay module 4 contains driver circuitry to provide a high-frequency voltage and current to the fixed antenna 3 via a source impedance, and circuitry to detect the variation in loading of the relay module and to supply a signal representing the variation to the display module 5.

The display module 5 processes the signals from the relay module for each wheel, applies any required signal corrections and displays the information to the driver. The display module is preferably mounted on, or behind the dash, in close proximity to or integrated with the actual display. The display module may, for example, be implemented as a single-chip microcontroller, or as part of an existing microcontroller that also performs other driver-information functions.

The FIG. 1 apparatus will now be described in more detail.

As mentioned in the introduction, for accurate tyre pressure measurement, a simple pressure measure is not adequate. Even in temperate zones the ambient temperature may vary by 30° C. and tyre heating, due to use, may increase the tyre temperature by a similar amount. The effect on absolute tyre pressure can be a 20% change and gauge tyre pressure may vary by 30% or more. This means that, to obtain desirably high accuracy, it is necessary to measure both pressure and temperature for the or each tyre.

If the values of atmospheric pressure and temperature are known, the value of the gauge pressure at the atmospheric temperature can be calculated using the standard gas laws:

$$P_g = P/T \cdot Ta - Pa \quad (1)$$

where $P_g$ is the required gauge pressure, P is the measured absolute pressure, T is the measured absolute temperature, and $P_a$ and $T_a$ are the atmospheric pressure and temperature respectively.

It would be possible to measure the absolute pressure P and the absolute temperature T separately and transmit two signals representing the measured values respectively to the vehicle. However, a preferred feature of tyre pressure measurement apparatus embodying the present invention is to combine the pressure and temperature measurements into a single parameter, namely the quotient ρ, where $$\rho = P/T \quad (2)$$

In order to simplify the required circuitry in the sensor module, it is desirable to design and connect the pressure and temperature sensing elements such that a signal is produced having a property that is a function of the quotient ρ.

The basic time period t of an RC oscillator is given by:

$$t = k_o \cdot R \cdot C \quad (3)$$

where $k_o$ is a constant, R is the resistive element and C is the capacitive element.

Similarly, the basic time period t of an LC oscillator is given by:

$$t = k_o \cdot \sqrt{L \cdot C} \quad (4)$$

where L is the inductive element and C is the capacitive element.

From this it can be seen that, if pressure affects one frequency-controlling element (e.g. C) and temperature the other (R), the two measurements can be combined inherently if the characteristics of the respective sensing elements are of an appropriate form.

For example, if the capacitance of the pressure sensing element is an almost linear function of the absolute pressure, a trimming capacitor allows for calibration of the capacitance-pressure characteristic to match a power function. Thus, the overall capacitance (pressure sensing element in combination with trimming capacitor) is given by:

$$C_p = k_p \cdot P^\phi \quad (5)$$

where $C_p$ is the overall capacitance, $k_p$ and $\phi$ are constants and P is the absolute pressure.

In this case, the temperature sensing element should have a resistance temperature characteristic that is an inverse power function to the power function of the capacitance-pressure characteristic of the pressure sensing element, at least to a good approximation over the required temperature range. In other words, $$R_t = k_t \cdot T^{-\phi} \quad (6)$$

where $R_t$ is the resistance, $k_t$ is a constant, $\phi$ is the same constant as in equation 5 and T is the absolute temperature.

Combining the pressure and temperature characteristics with the oscillator time-period function gives $$t = k_o \cdot k_p \cdot k_t \cdot (P/T)^\phi \quad (7)$$

It follows from equation 7 that it is possible to recover the value of the quotient ρ from the frequency of the oscillator. In this way, temperature compensation of the measured pressure is achieved without resort to using two separate data channels to convey pressure and temperature data separately.

Incidentally, if the pressure sensing element characteristic is linear, the value of $\phi$ in equation 5 will generally be equal to 1. However, if the pressure sensing element has a characteristic that is not linear or that is such that the extrapolated value of its capacitance at a complete vacuum is not equal to 0 or negative, it will not be possible to trim the capacitance-pressure characteristic of equation 5 to a proportional power curve by adding a trimming capacitance. Nonetheless, as the regions of interest in both the capacitance-pressure and resistance-pressure characteristics are substantially away from the origin, power curves with values of $\phi$ not equal to 1 can be closely matched using suitable values of trimming capacitor for the pressure sensing element and series resistor for the temperature sensing element.

Preferred designs of pressure and temperature sensing elements will be described in more detail later in the present specification.

Next, coupling between the sensor module 1 on the or each wheel and its associated relay module 4 on the vehicle will be explained. This coupling must serve to transmit at least one signal from the sensor module 1 to the relay module 4, from which signal the relay module can derive the relevant measurement parameter(s) (e.g. the quotient $\rho$) produced by the sensor module 1.

Furthermore, in a preferred embodiment, the coupling also serves to transmit power from the vehicle to the sensor module 1.

As the vehicle wheels rotate relative to the vehicle axles when the vehicle is in use it is preferable that the coupling between the sensor and relay modules is by non-contact means so that wear is eliminated. Two non-contact coupling methods can be used to transmit power in one direction and receive a signal in the other direction: capacitive coupling and magnetic coupling. Radio, which is used in some conventional tyre pressure measurement systems, can only effectively be used to transmit signals and requires a local power source (battery) in the wheel. Furthermore, radio is by its nature a pervasive medium and presents additional problems.

Capacitive coupling is the preferred coupling method for use in the present invention. This can be achieved simply by the use of conducting plate antennae separated by an air gap. The electric potential on one plate produces a localised electric field that induces a potential on the other. The plates themselves can be protected by being covered by an insulating material. The plates do not have to be planar or of the same size.

Antennae in the form of simple conducting plates are far less prone to electromagnetic interference than coils.

It is also possible to use magnetic induction between two closely-spaced concentric coils, one mounted on the axle and the other on the wheel. With this method, the sensor module 1 on the wheel and the relay module 4 on the axle are coupled when the magnetic field from one coil links with the other coil. In practice, magnetic coupling may be difficult to arrange because of the positions at which brake components are normally arranged on the wheels. Large diameter coils could be used to avoid the brake components but these are particularly susceptible to electromagnetic interference.

Both with capacitive and magnetic coupling, only AC currents can be transmitted through the coupling.

Transmission of power through the coupling is achieved by the relay module (source) applying an alternating voltage to the coupling, and by the sensor module (load) taking a current from the coupling.

Transmission of information from the load back to the source is carried out by varying the load. If the current taken by the load must come from the source, it follows that measurement of this current at the source will show any variation in the load. This is the principle on which most passive sensors operate, i.e. the sensor impedance changes according to the parameter being measured and the electrical load presented by the sensor is measured.

In order to ensure that the only supply of current to the load is from the source, it is preferable to make the load frequency selective. In this way, noise outside the chosen frequency band is rejected and does not produce significant current in the load which might adversely affect the signal.

Because the impedance of the coupling between the source and the load is not negligible and may vary, in many (but not all) situations it is not satisfactory to measure the load directly to get accurate information.

To overcome this problem, a preferred feature of the present invention is to encode the sensor information as a frequency and to modulate the load by this frequency. It is the frequency of variation of the load that is then decoded to recover the desired sensor information. In this way, drift in the value of the coupling impedance does not affect the information being transmitted.

The relay module (source) can be regarded as having a complex impedance $Z_s$, the coupling a complex impedance $Z_c$, and the sensor module (load) a complex impedance $Z_L$. For maximum power transmission the impedance as seen by the load should match the load impedance. Similarly, for best reception of the load variation, the impedance as seen by the source should match the source impedance. Thus, for best performance, $Z_L$ should match $Z_C+Z_s$, and at the same time $Z_s$ should match $Z_c+Z_L$.

This cannot be achieved if both $Z_c$ and $Z_L$ are purely resistive and not even well approximated unless $Z_c$ is very small. If, on the other hand, $Z_L$ or $Z_s$, or both, are complex, and $Z_c$ has no real component (as will be the case in capacitive coupling and can be arranged using inductive coupling), the desired matching can be achieved.

In the case of complex impedances, matching means that the real (resistive) components should be the same and the imaginary (reactive) components should be complimentary, i.e. the same in magnitude and opposite in sign (the complex conjugate).

In order to make the load frequency selective, it may be considered to use coupled tuned circuits which are highly selective. Effectively, this enables the impedances of the source and load to swamp the coupling impedance and thereby approach the matching criteria.

The load is then varied in either magnitude or phase or both to produce the signal. However, if tuning is to be maintained, load variation must either be only in the resistive part of the load (magnitude variation), or, if it is in the reactive part (phase variation) it must be kept to a very low level. These requirements are problematic in practice. Firstly, a large variation in magnitude has a correspondingly large effect on the power transmitted. Furthermore, if signals are small, high levels of amplification must be used. This in turn increases the demand for selectivity because otherwise noise will be amplified with the required signals.

In order to solve these problems associated with tuned circuits, while at the same time achieving a satisfactory degree of frequency selectivity, the present invention employs a "detuned resonator" to provide the load impedance $Z_L$ i.e. a resonator whose natural resonant frequency is "detuned" from the frequency of an excitation signal applied to the resonator. In this way, tight tolerances for tuning are not required. Also, relatively large signals can be used without disturbing power transmission, so that very high levels of amplification are not required and selectivity demands are reduced. Additionally, sensitivity to tuning drift is drastically reduced.

A detuned resonator used to provide the load $Z_L$ comprises an inductor, and associated series resistance, in parallel with a capacitor. Active elements equivalent to such inductors, resistances and capacitors can be used, but these will require power. In this way, impedance matching can be achieved even when the coupling impedance is comparable with the source and load impedances.

If the coupling impedance is capacitive, an excitation frequency lower than the resonant frequency of the resonator is used. On the other hand, if the coupling impedance is inductive, an excitation frequency higher than the resonant frequency of the resonator is used.

The load can be readily varied by altering either of the reactive components that make up the resonator, and, less preferably, by altering the resistive component. Because of the characteristic curve of impedance against frequency of the resonator, a large change in impedance can be produced with a small change in value of one of the reactive components.

Using a detuned resonator with a relatively low quality factor Q (for example in the range from 10 to 30)—see equation (15) below—wide component tolerance is acceptable and the need to tune circuits individually can be avoided.

Additionally, because a resonator is still frequency-selective it will reject excitation and noise at frequencies outside its bandwidth. Although this bandwidth is wider than that of a highly tuned circuit, signal amplification does not need to be as high.

This selectivity means that more than one sensor module can be driven by one relay module using the same antennae for coupling if the sensor modules have different resonant frequencies and the relay module switches between different excitation frequencies.

Figure 2:
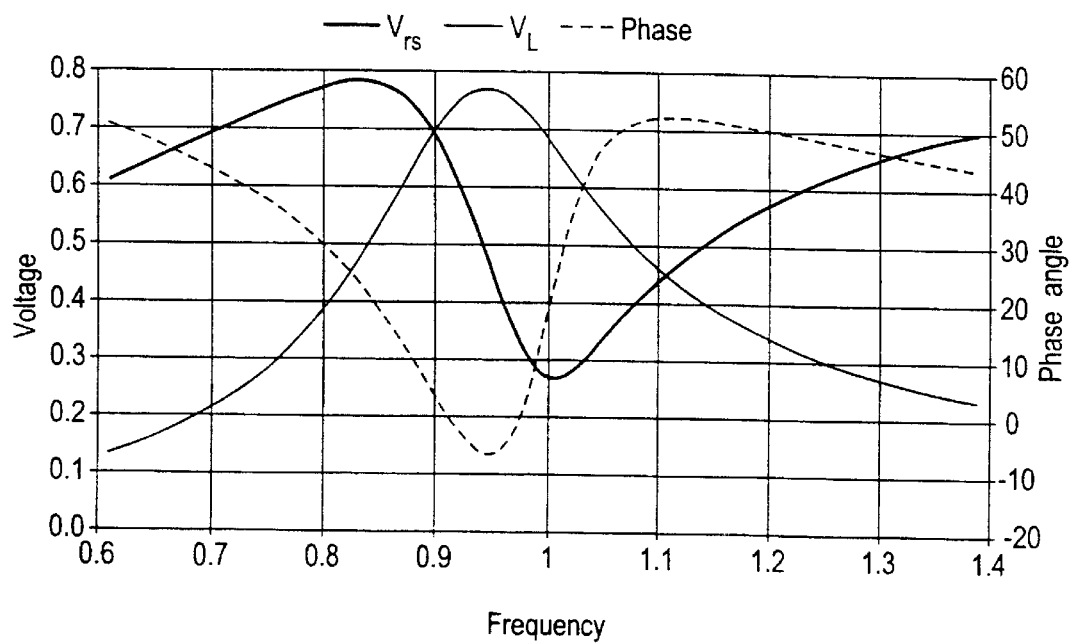
FIG. 2 shows a graph for use in explaining operation of FIG. 1 apparatus.

FIG. 2 is a graph for use in illustrating the characteristics of a capacitively coupled resonator. All three curves in FIG. 2 have been normalised for a resonant frequency Ω of 1. In FIG. 2, the bold curve represents the variation in voltage $V_{rs}$ across a resistive source impedance (see e.g. Zs in FIG. 5) with (normalised) excitation frequency ω. This voltage $V_{rs}$ is a measure of current flowing to the load. The feint curve shows the variation in voltage $V_L$ across the load with excitation frequency. The dashed curve shows the variation in phase with excitation frequency. Since a change in one of the reactive components in the resonator changes the resonator's frequency, this can be considered as an equivalent shift in excitation frequency ω.

The region of interest in FIG. 2 includes the frequency range between the maximum and the minimum of $V_{rs}$ where $V_L$ is high enough to power the load. In addition, the region of interest extends slightly beyond this max-min frequency range up to an upper reverse frequency and down to a lower reverse frequency. At each of these reverse frequencies the effect on the load current of a change in the resonator reactance is reversed. This region is, for example, at least from a value lower than 0.85 times the resonant frequency (possibly as low as 0.8 times) to a value higher than 0.97 times the resonant frequency but does not include the resonant frequency itself or (in the case of a capacitively coupled resonator) frequencies higher than the resonant frequency. Outside this region there is insufficient power transmission to the load so other frequencies will be rejected. In this region the slope of $V_{rs}$ is steep so that a variation in ω (i.e. a variation in one of the reactive components) will produce a large corresponding change in $V_{rs}$.

The usable bandwidth, defined as the region between the maximum and minimum of the $V_{rs}$ versus ω curve in FIG. 2, depends primarily on the ratio of the load resonator capacitance to the coupling capacitance. A high ratio gives a narrow band; a low ratio gives a wide band. In particular, the equation defining the curve concerned is:

$$V_{rs} = \left| \frac{V \cdot R_s}{R_s + \left( \frac{1}{i \cdot \omega \cdot C_c} + \frac{1}{\frac{1}{R_L} + \frac{1}{R + i \cdot \omega \cdot L} + i \cdot \omega \cdot C} \right)} \right| \quad (8)$$

where V is the excitation voltage, $R_s$ is the source impedance, ω is the excitation frequency, $C_c$ is the coupling capacitance, $R_L$ is the equivalent load resistance, R is the resonator damping resistance, L is the resonator inductance and the C is the resonator capacitance.

Figure 3:
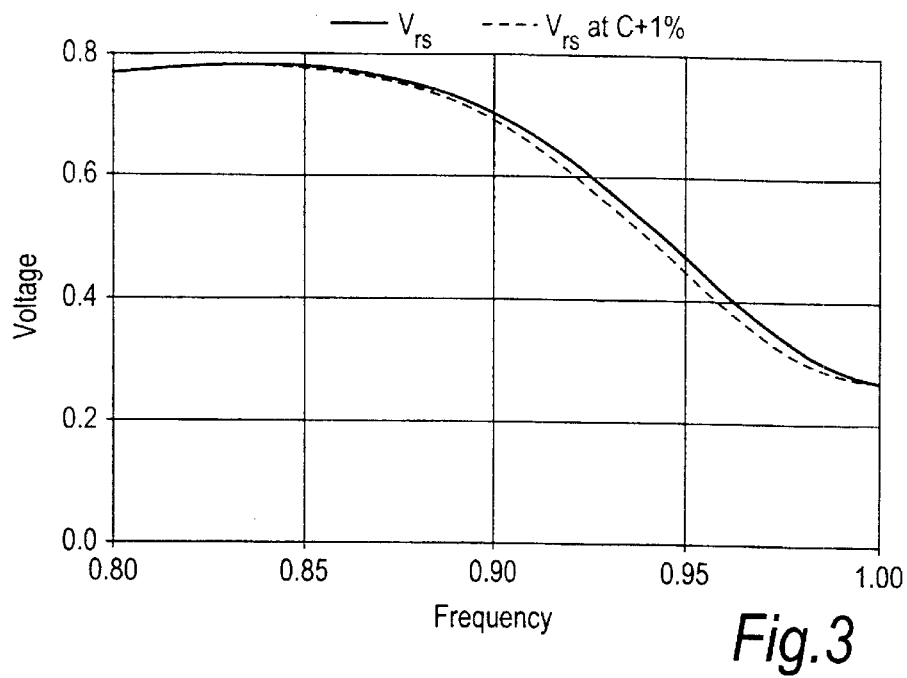
FIGS. 3 and 4, show further graphs illustrating, to a larger scale than the FIG. 2 graph, operation in a frequency range of interest in FIG. 2.

FIG. 3 shows the region of interest expanded with two plots of the voltage $V_{rs}$ for two different values of resonator capacitance which differ by 1%. This shows the variation in $V_{rs}$ that can be expected at a 1% change in load capacitance at a given excitation frequency within the region of interest. Again, the voltage $V_{rs}$ is a measure of current flowing to the load.

Figure 4:
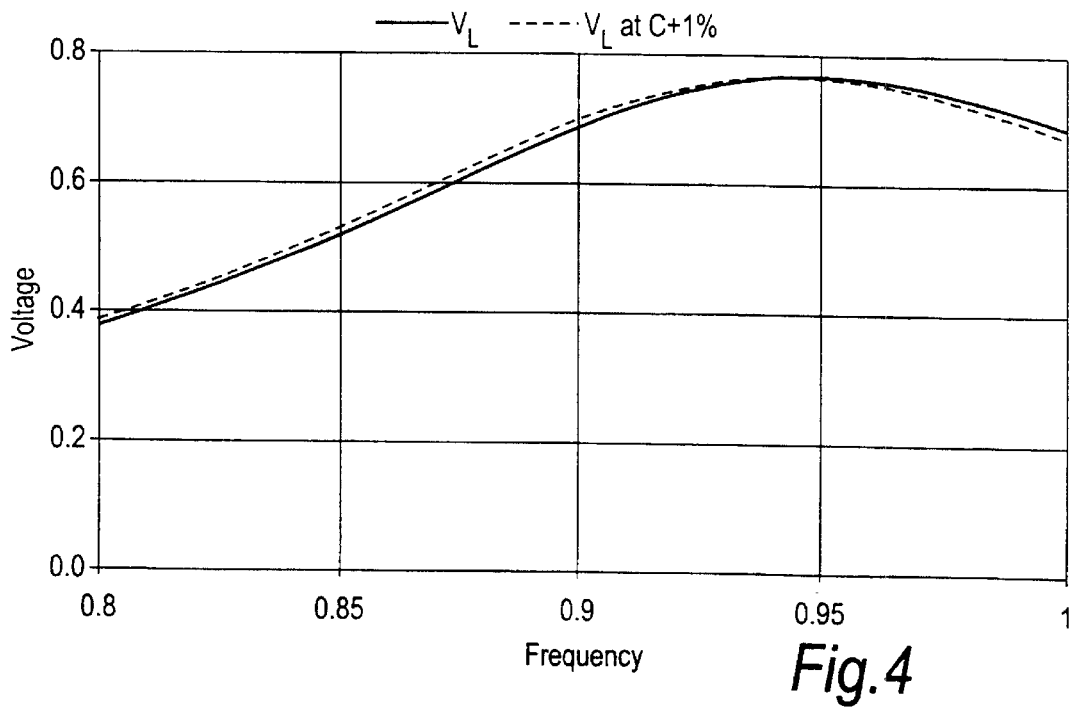

FIG. 4 shows the characteristics of the load voltage $V_L$ for the same 1% variation in load capacitance. It can be seen that there is a large area of overlap between the two curves. At an excitation frequency ω of approximately 0.95 of the resonant frequency Ω the two curves cross and there is no detectable change in the load voltage for a change in the resonator capacitance. This is useful in some critical applications, as described later with reference to FIG. 18.

An analysis of the circuit configuration shows, as might be expected, that the primary limitation to power transmission is the coupling impedance. The power $P_L$ available at the load is given by $$P_L = \left| \frac{1}{\left( 1 + \left( R_s + \frac{1}{i \cdot \omega \cdot C_c} \right) + \left( \frac{1}{R_L} + \frac{1}{R + i \cdot \omega \cdot L} + i \cdot \omega \cdot C \right) \right)^2} \right| \cdot \frac{V^2}{R_L} \quad (9)$$

The size of the antennae 2 and 3 required when using capacitive coupling depends primarily on the power requirement of the sensor module. To allow for component tolerance, only a proportion of the maximum transmittable power can be relied upon. The amount of available power is given by the following conservative approximation.

$$P_L = \frac{V^2}{8} \cdot \Omega \cdot C_c \quad (10)$$

where Ω is the resonant frequency.

The sensor module to be described later in the present specification requires less than 100 µW at 2.5 volts. If this power is provided by an excitation voltage of 1.75V (=5V peak-to-peak) and a resonator frequency of 11 MHz (giving an excitation frequency of approximately 10 MHz) a minimum coupling capacitance of 4 pF is required.

However, in practice, parasitic capacitance may be present on either or both sides of the coupling capacitor. This affects both power and signal transmission.

On the relay-module side the effect on power is not severe as this can be readily compensated for by increasing the drive capability of the output buffer. The received signal from the sensor module is attenuated but increased amplification of the detected signal can readily compensate.

Parasitic capacitance effects on the sensor-module side are significant. For the sensor circuitry, power is at a premium and parasitic capacitance affects the frequency of the circuit. If this capacitance is predictable and fixed it can be included in the main capacitance element of the circuit. If not, the circuit tuning will be adversely affected.

To overcome these problems and still maintain good power supply to the sensor circuitry, the parasitic capacitance can be included as part of a tapped capacitor that forms part of the main capacitive element of the resonator.

Figure 5:
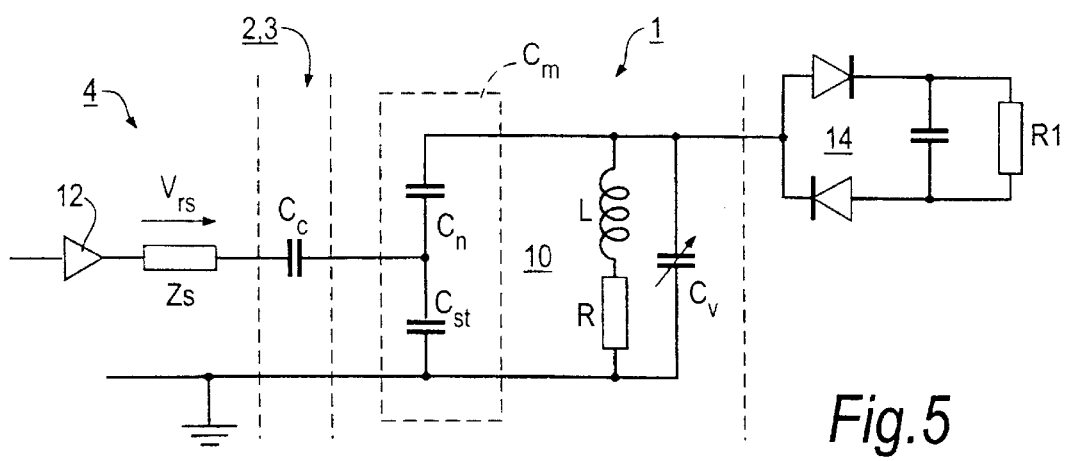
FIG. 5 shows a schematic circuit diagram for use in explaining parasitic capacitance effects in the FIG. 1 apparatus.

FIG. 5 is a schematic representation of the coupling between the relay module and the sensor module. As shown in FIG. 5 the sensor-module resonator 10 may be considered to include a main capacitive element $C_m$, a variable capacitive element $C_v$, an inductance L and a resistive element R. As will be described later in more detail, the variable capacitive element $C_v$ has its capacitance varied in dependence upon the measurement parameter ρ.

The main capacitive element $C_m$ is, as already stated, a tapped capacitor made up of a first (or network) capacitor $C_n$ in series with a second (or parasitic) capacitance $C_{st}$.

The coupling capacitance $C_c$ can effectively be regarded as linking an output source impedance $Z_s$ (including a blocking capacitor and inductance as well as a source resistance) on the output-buffer side of the relay module with the tap node between the network and parasitic capacitances $C_n$ and $C_{st}$. This limits the effects of parasitic capacitance variation and at the same time steps up the voltage on the resonator.

Exemplary values for the various circuit elements are shown in Table 1 below.

TABLE 1

| ELEMENT | VALUE |
| --- | --- |
| $C_c$ | 15 pF |
| $C_n$ | 56 pF |
| $C_{st}$ | 100–200 pF |
| $C_v$ | 10–11 pF |
| L | 4.7 uH |
| R | 33 R |
| R1 | 50 K |
| $Z_s$ | 330 R |

Although the inclusion of the network capacitance in the main capacitive element of the resonator helps to limit the effects of parasitic capacitance variation, there are limits to how much parasitic capacitance can be accommodated. The parasitic capacitance $C_{st}$ reduces the voltage applied to the sensor module in proportion to its capacitance relative to that of the coupling. capacitance $C_c$ (as in a standard capacitor divider network). For a coupling capacitance $C_c$ of 15 pF and a parasitic capacitance of $C_{st}$ of 135 pF the voltage applied to the module will be reduced to one tenth.

The effect of variation in parasitic capacitance is also mitigated if the network capacitor $C_n$ is small, but in this case power available at the resonator is also small. As the network capacitor $C_n$ is increased in capacitance, more power becomes available but parasitic capacitance variation has a greater effect on resonator tuning. The detuned resonator 10 with a Q of 10 to 15 has a wide frequency tolerance of 10 to 15%. In a LC resonator this corresponds to a total tolerance in the reactive components of 20 to 30%.

If tight tolerances are maintained in the specified components a wide variation in parasitic capacitance can be tolerated. A circuit with a Q of 10 using a 4.7 pH inductor with a 56 pF network capacitor and 10 pF of variable capacitance $C_v$ can operate over a range of 100 pF to 200 pF of parasitic capacitance and maintain good signalling power if specified component tolerances do not exceed 3%. Driven by a 9V drive, a power supply to the sensor module of 150 μW minimum and signal level of 20 μA minimum will be maintained.

The capacitance of parallel plates is given by $$C = e_0 \cdot A / d \quad (11)$$

where C is the capacitance, A is the plate area, d is the plate separation and $e_o$ (=8.854 pF/m) is the permittivity of air.

The minimum possible plate separation depends on the clearance tolerances that can be maintained. If it is assumed that a minimum 1 mm clearance (including insulation) must be maintained and that a tolerance of ±1 mm can be maintained, the maximum plate separation will be 3 mm. For this spacing to meet a minimum capacitance requirement of 10 pF the plate area must be at least 3388 mm$^2$ if a bearing-coupled return (explained later with reference to FIG. 6) with effectively zero impedance used. If a second plate is used for the return path, two plates, each twice this size, must be used.

Figure 6:
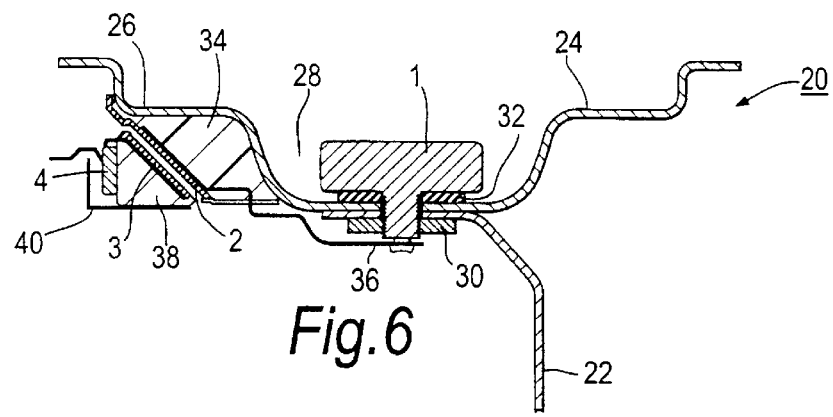
FIG. 6 shows a schematic cross-sectional view of a vehicle wheel, for explaining a physical arrangement of parts of the FIG. 1 apparatus in one embodiment of the invention.

FIG. 6 is a schematic cross-sectional view illustrating an example of the possible physical arrangement of the sensor module 1, the wheel antenna 2, the fixed antenna 3 and the relay module 4 in relation to a vehicle wheel 20. The wheel 20 has a flange 22, an outer rim 24, an inner rim 26 and a well 28 between the inner and outer rims 24 and 26.

The sensor module 1 which is mushroom-shaped has an externally-threaded base portion which projects through a hole in the well 28 and is retained in place by a retaining nut 30. A seal 32 is provided between the base of the sensor-module head and the well 28 to provide an airtight seal between the sensor module and the wheel.

The sensor module 1 in FIG. 6 preferably has a metal casing which provides its earth connection directly to the wheel well 28.

Incidentally, it will be appreciated that in the FIG. 6 arrangement the earth connection for the sensor module 1 (return path) is implemented through the wheel bearing. Although this is unreliable as an ohmic connection alone, it will operate satisfactory as a capacitive connection in parallel with an ohmic connection at the frequencies proposed.

The wheel antenna 2 is shaped as the frustum of a cone so as to fit under the inner rim 26 of the wheel. The wheel antenna 2 is intended to snap into the recess in the underside of the rim 26 formed by the bead retaining hump used on modern wheels. The width of the wheel antenna 2 may be, for example, 20 mm. By making the wheel antenna 2 conical, fitment of the wheel is kept simple and the coupling to the fixed antenna will be less susceptible to axial run out of the wheel rim than if a plane antenna was used. In addition, the antennae surfaces will be self-draining both when stationary and rotating, and there is no interference with wheel balancing weights.

The wheel antenna 2 is supported by polymer backing material 34 between the inner rim 26 and the rear face of the wheel antenna 2. An electrical connection (a single wire) 36 extending between the base portion of the sensor module 1 and the rear face of the wheel antenna 2 connects the wheel antenna 2 to the circuitry inside the sensor module.

The fixed antenna 3 is supported by more polymer backing 38 on a mounting bracket 40. In this embodiment a fixed antenna 170 mm long is required to provide the necessary area. On a standard 13 inch wheel rim, this subtends an angle of about 60°. No modification to the axle will be required except for the provision of mounting points for the fixed antenna. These can generally be common with the brake mountings. The relay module 4 is preferably arranged locally at the axle (i.e. is integral with the fixed antenna 3), as shown in FIG. 6. Alternatively, the relay module may be remote from the fixed antenna 3, for example integral with the display module, in which case connection to the fixed antenna will be through coaxial cable or by twisted pair.

Next, the components of the FIG. 1 apparatus will be described in detail, starting with the sensor module 1.

Figure 7:
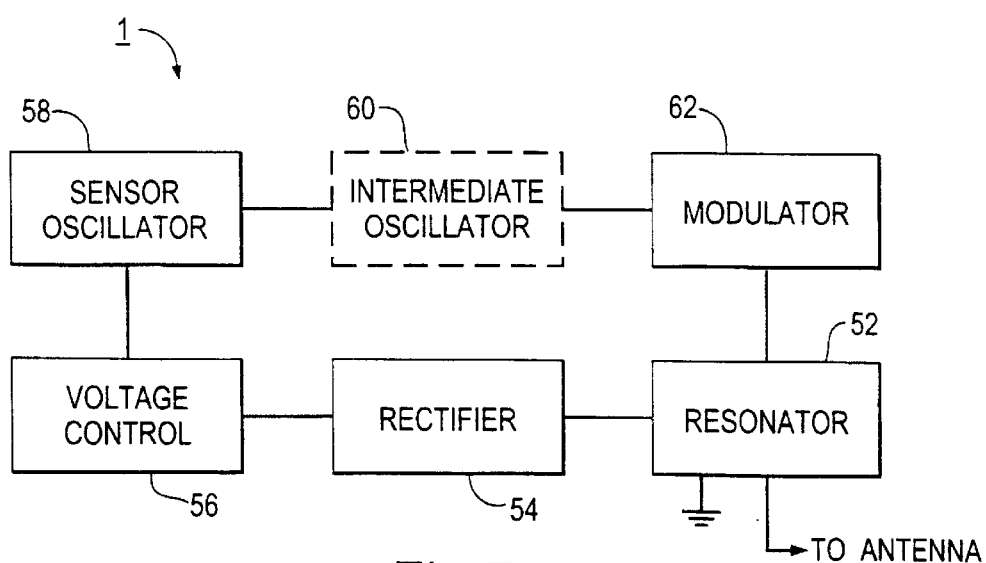
FIG. 7 shows a block circuit diagram of a sensor module included in the FIG. 1 apparatus.

FIG. 7 shows a block diagram illustrating the principal elements of the sensor module 1 in a preferred embodiment of the present invention.

Figure 8:
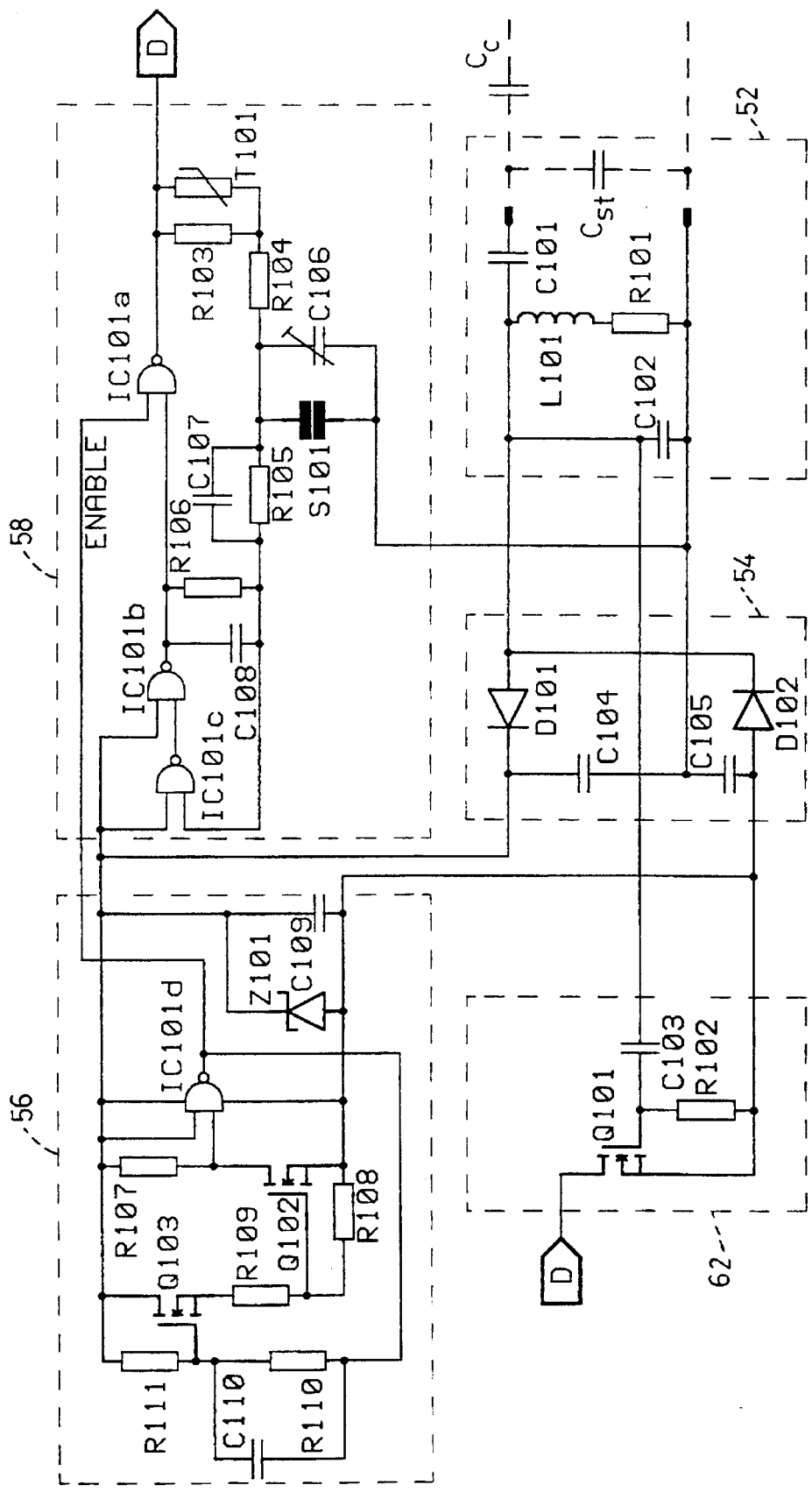
FIG. 8 is a detailed circuit diagram corresponding to FIG. 7.

The sensor module 1 comprises a resonator 52 connected to the wheel antenna 2, a rectifier 54 connected to the resonator, a voltage control portion 56 to the rectifier, a sensor oscillator 58 connected to the voltage control portion, and a modulator 62 connected to the sensor oscillator 58, either directly or via an optional intermediate oscillator 60. The modulator 62 is also connected to the resonator 52. A complete circuit diagram of the sensor module 1 is shown in FIG. 8. By way of example, two alternative lists of the components suitable for use in FIG. 8 are given in Table 2 below.

TABLE 2

| ELEMENT | EXAMPLE LIST 1 | EXAMPLE LIST 2 |
|---|---|---|
| C101 | 56 pF | 56 pF |
| C102 | 2 pF | 4.7 pF |
| C103 | 18 pF | 18 pF |
| C104 | 100 pF | 100 pF |
| C105 | 100 pF | 100 pF |
| C106 | 47 pF | 22 pF + 5–22 pF |
| C107 | 56 pF | 10 pF |
| C108 | 33 pF | 5.6 pF |
| C109 | 1 uF | 1 uF |
| C110 | 1 nF | 1 nF |
| D101 | BAT17 | BAT17 |
| D102 | BAT17 | BAT17 |
| IC101 | 74HC00 | 74HC00 |
| L101 | 3.9 uH | 3.9 uH |
| Q101 | BST82 | BST82 |
| Q102 | FDV301N | FDV301N |
| Q103 | FDV301N | FDV301N |
| R101 | 30 R | 30 R |
| R102 | 1 M | 1 M |
| R103 | 24 K | 24 K |
| R104 | 91 K | 240 K |
| R105 | 330 K | 560 K |
| R106 | 560 K | 1 M |
| R107 | 1 M | 1 M |
| R108 | 560 K | 560 K |
| R109 | 680 K | 680 K |
| R110 | 220 K | 220 K |
| R111 | 12 K | 12 K |
| S101 | 50–100 pF | 50–100 pF |
| T101 | 15 K | 15 K |
| Z101 | BZX84C6V2 | BZX84C6V2 |

As shown in FIG. 8 the resonator 52 consists of an inductor L101, with a series damping resistor R101, in parallel with a capacitance C. The capacitance C is made up of a main capacitor $C_m$ (the network capacitor C101, deliberately provided in the resonator network, in series with the stray capacitance $C_{st}$: see FIG. 5) and a further, variable, capacitance (corresponding to the capacitance $C_v$ in FIG. 5) provided by capacitors C102 and C103 and the gate capacitance of a transistor Q101 in the modulator 62. C102 includes internal stray capacitance of the resonator 52.

Thus, the total capacitance C of the resonator 52 is distributed and includes, in addition to the network capacitor C101, the modulator-coupled capacitance (associated with Q101), any stray capacitance $C_{st}$, as well as any diode capacitance associated with diodes D101 and D102 in the rectifier 54. The resonant angular frequency $\Omega$ is defined by the capacitance C and by the inductance L of the inductor L101:

$$\Omega = \frac{1}{\sqrt{L \cdot C}} \quad (12)$$

The impedance $Z_L$ of the unloaded resonator is given by $$Z_L = \frac{R + i \cdot \omega \cdot L}{1 - \omega^2 \cdot L \cdot C + i \cdot \omega \cdot C \cdot R} \quad (13)$$

where R is the resistance of the resistor R101 in the resonator 52.

If the excitation frequency $\omega$ of the relay module 4 is expressed as a fraction $\alpha$ of the resonant frequency $$\omega = \alpha \cdot \Omega \quad (14)$$

and the quality factor Q is defined by $$Q = \frac{1}{R} \cdot \sqrt{\frac{L}{C}} \quad (15)$$

it follows that the impedance is given by $$Z_L = \frac{R \cdot Q \cdot (1 + i \cdot a \cdot Q)}{(1 - a^2) \cdot Q + i \cdot a} \quad (16)$$

Equation 16 is modified if the resonator is loaded.

The rectifier 54 in FIG. 8 is made up of diodes D101 and D102 and a capacitive filter made up of the capacitors C104 and C105. The two diodes provide split-phase rectification, giving a DC voltage equal to the peak-to-peak AC voltage developed across the resonator 52 less the two diode voltage drops.

The voltage control portion 56 is made up of a Zener diode Z101, NAND gate IC101*d*, n-channel field-effect transistors (FETS) Q102 and Q103, resistors R107 to R111 and capacitor C110. The Zener diode Z101 acts as a shunt to prevent over-voltage (more than 6.2V in this embodiment). The remaining components in the voltage control portion 56 operate to produce an ENABLE signal which has the high logic level (H) when the supply voltage produced by the rectifier 54 is greater than or equal to a minimum voltage for proper operation of the sensor oscillator 58. In this embodiment, for example, the minimum voltage is approximately 2.4V.

Operation is as follows. When the sensor module is first powered up, the gate-source voltages of the FETs Q102 and Q103 are initially zero, so Q102 and Q103 are off and the input to the NAND gate IC101*d* connected to Q102 has the H level. The ENABLE signal therefore has the low logic level (L). As the supply voltage produced by the rectifier 54 increases, Q103 is partially turned on and current flows through R109 and R108, until the voltage across R8 is sufficient to turn on Q102. IC101*d* then switches the ENABLE signal to the H level. The capacitor C110 provides rapid positive feedback with R110 providing hysteresis so that the supply voltage at which the ENABLE signal is switched from H to L (the supply voltage turn-off threshold) is lower than the supply voltage at which the ENABLE signal is switched from L to H (the supply voltage turn-on threshold). The supply voltage threshold (neglecting hysteresis) is determined by the threshold voltages of Q102 and Q103 (which are substantially equal to one another) and the ratio of R108 and R109. When the ENABLE signal has the L level the current flowing through the feedback loop is set by R110; R110 is switched to non-conducting when the ENABLE signal is changed to the H level. The hysteresis is determined by the ratio of R111 to R110.

The threshold voltages of Q102 and Q103 are temperature-dependent, i.e. they drop with temperature. This means that the supply voltage threshold automatically adapts to ambient temperature of the sensor module so that at higher temperatures the supply voltage threshold is lowered. This is desirable because the minimum operating voltage of further circuitry in the sensor module, particularly NAND gates in the sensor oscillator 58 which also contain FETs with threshold voltages that are temperature-dependent in the same way as the threshold voltages of Q102 and Q103, is also lowered as the ambient temperature rises.

Incidentally, to some extent the current consumed by the sensor module circuitry is self-regulating with temperature. The current drawn by the circuitry tends to rise with temperature (because the transistor threshold voltages fall) but, as the current drawn by the circuitry increases, the supply voltage falls so that the current consumption falls back.

The sensor oscillator 58 includes a pressure sensor S101 and a negative-temperature-coefficient (NTC) thermistor T101. The pressure sensor S101 has a parallel trimming capacitor C106, and the thermistor T101 forms part of a resistor network with the further resistors R103 and R104.

The sensor oscillator further includes resistors R105 and R106, capacitors C107 and C108, and first, second and third NAND gates IC101a to IC101c. Unlike a conventional two- or three-gate RC logical oscillator, which switches its capacitive element to give positive feedback with its resistive element providing negative feedback, the oscillator 58 in FIG. 8 is designed to use a single-ended capacitive element.

In operation the pressure sensor S101 and trimming capacitor C106 are alternately charged and discharged, via a resistor network formed by T101, R103 and R104, by the output of the NAND gate IC101a. The potential difference between, on the one hand, the top plates of the capacitors S101 and C106 and, on the other hand, the output of the NAND gate IC101b (L when charging and H when discharging) is divided by a potential divider network made up of R10S and R106 and fed back to the input of IC101c. When this feedback voltage reaches the switching threshold of IC101c the NAND gates IC101a–c switch and output of IC101b, which is connected to the divider network formed by R105 and R106, is changed to the opposite logic level. Effectively, this provides the oscillator with separate threshold voltages for switching when S101/C106 are charged and discharged.

The capacitor C108 is connected in parallel with R106 to provide rapid positive feedback and thus clean switching. C107 is connected in parallel with R105 to compensate for C108. The ratio of C108 to C107 is chosen to match the ratio of R105 to R106 so that the same ratio of divider is formed by both these capacitors and these resistors.

The oscillator 58 has a very low current consumption, despite the fact that the resistive elements are always conducting in a feedback loop around IC101a. The majority of the current consumed goes into charging and discharging the capacitors. However, the bulk of the capacitance is not switched; only C107 and C108 in series are switched. Thus, power consumption is lower than in a conventional oscillator.

R105 and R106 act in opposition to the resistor network of T101, R103 and R104, and C107 and C108 form a capacitor in parallel with S101 and C106, so the charging/discharging network actually includes all the resistive elements and two different outputs, and the timing capacitance (S101 and C106) is supplemented by the other capacitive elements C107 and C108.

The basic time period t of the sensor oscillator is given by Equation 17:

$$T = \frac{2 \cdot (R_f + R_s) \cdot R \cdot (C + C_s)}{R_f + R_s + R} \cdot \qquad (17)$$

$$\mathrm{Ln}\left(\frac{1 - \frac{R_f + R_s + R}{R_f + R_s} \cdot \left(\frac{R_f - R_s}{2 \cdot R_f} - \frac{C_s}{C + C_s}\right)}{1 - \frac{R_f + R_s + R}{2 \cdot R_f}}\right)$$

where R is the effective resistance of the network containing T101, R103 and R104, $R_f$ is the resistance of the first portion R106 of the divider network, $R_s$ is the resistance of the second portion R105 of the divider network, C is the timing capacitance (i.e. S101 in parallel with C106) and $C_s$ is the effective capacitance of C107 and C108 in series.

Although the two variable terms R and C appear within the logarithmic term of equation 17, the variation of the logarithmic term with R and C is relatively small compared to the variation with R and C of the other term in equation 17. That other term is effectively an RC product if C and $C_s$ are combined and the resistive term is equivalent to R in parallel with a resistor made up of $R_f$ and $R_s$ in series. Thus, with suitable component values, the resistive elements including the NTC thermistor T101 can provide an effective resistance that (at least away from the origin) is a good approximation to a power function of inverse absolute temperature.

Thus, the capacitive element of the sensor oscillator 58 conforms to equation 5 above, whilst the resistive element conforms to equation 6 above. Accordingly, it follows that the oscillator time period conforms to equation 7 above, i.e. the oscillator frequency is an inverse power function of the quotient ρ (=P/T).

The sensor oscillator frequency varies, for example, in the range from 10 kHz to 20 kHz with ρ.

The output of the sensor oscillator 58 is applied to the modulator 62. The modulator comprises an n-channel metal-oxide-semiconductor field-effect transistor (MOSFET) Q101, a resistor R102 and a capacitor C103. The drain of the MOSFET Q101 is connected to the sensor oscillator output, the source of Q101 is connected to the negative supply rail, and the gate of Q101 is connected via the capacitor C103 to the resonator 52. The gate capacitance of Q101 varies substantially with its drain-to-source voltage $V_{ds}$, particularly at low voltages. Thus, the sensor oscillator output voltage modulates the gate capacitance of Q101. This gate capacitance, in series with the capacitance of the coupling capacitor C103 together with further internal stray capacitance (denoted schematically by C102 in FIG. 8), is thus connected in parallel with the main capacitance $C_m$ of the resonator 52.

The gate capacitance of the MOSFET Q101 varies, for example, from 30 pF at $V_{ds}$=0V to 20 pF at $V_{ds}$=2.5V.

The coupling capacitance C103 serves two purposes. Firstly, it attenuates the capacitance variation brought about by the modulator 62 significantly (e.g. taking the above gate capacitance variation from 30 to 20 pF the capacitance variation at the modulator 52 is from 11.3 pF to 9.5 pF, a variation of 16%. This has the beneficial effect of reducing the effect of the variation between individual transistors used for Q101. Secondly, the capacitor C103 reduces the gate voltage applied to the gate of the MOSFET Q101 to approximately 37% of the resonator voltage. Thus, Q101 stays below its conduction level. Incidentally, in place of the MOSFET, a varicap diode, or in fact any reverse biased diode could be used, but such diodes generally have less capacitance variation at low voltages and do not provide isolation between the sensor oscillator 58 and the resonator 52.

Incidentally, as will be described later in more detail with reference to FIG. 11, although the modulation of the resonator capacitance has an effect on the resonant frequency of the resonator 52, it is the sensor oscillator frequency (not the resonant frequency) that is the quantity detected in the relay module 4 in this embodiment.

As shown in FIG. 7, it is possible to include an additional intermediate oscillator 60 between the sensor oscillator 58 and the modulator 62. This oscillator 60 is modulated by the output of the sensor oscillator 58 in an intermediate frequency band between the frequency band of the sensor oscillator and the excitation frequency. The intermediate oscillator in turn modulates the load resonator 52 via the modulator 62. This intermediate frequency thus acts as a sub-carrier. This requires additional detection circuitry in the relay module but greatly enhances noise immunity as the intermediate oscillator is unaffected by variations and noise in the coupling. The modulation of the sub-carrier can be of any form but frequency modulation is preferred as this is simple to implement and gives a large improvement in noise immunity.

Figure 9:
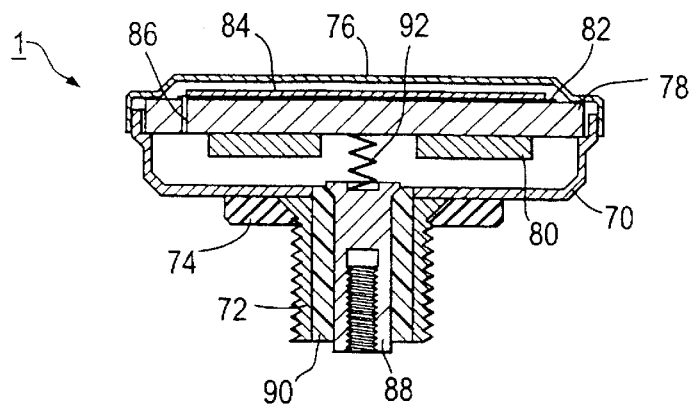
FIG. 9 shows a schematic cross-sectional view of the sensor in one embodiment of the invention.

FIG. 9 shows a possible construction of the sensor module 1. The module 1 has a housing 70 made, for example, of a metal such as brass. An externally-threaded tube 72, preferably made of the same material as the housing 70, is formed integrally (e.g. by welding) with the housing at the central part of the base of the housing. A seal 74 is provided between the module 1 and the wheel. The seal is made of, for example, rubber.

The housing 70 is capped by a diaphragm 76 which is, for example, a metal pressing. The diaphragm is welded or glued to the housing 70 in gas-tight manner. Within the space defined by the diaphragm 76 and the housing 70 is housed a printed circuit board 78. The board 78 carries on its underside components 80, being the circuit components shown in FIG. 8. On the top side of the board 78 a circular electrode 82 is formed by a copper pad printed on the board. The electrode is covered by a thin dielectric sheet 84. The electrode 82 is connected to the circuitry on the underside of the board 78.

The space containing the board 78 can either be evacuated or air/gas-filled to a predetermined pressure depending on the sensing characteristic required. A via hole 86 connects the two chambers above and below the board 78 so that internal pressure is equalised.

Within the tube 72 a connector socket 88 is fitted. The socket is insulated from the tube 72 and housing 70 by an annular insulator 90. The socket is connected by a spring 92 to the board 78.

In the use of the sensor module of FIG. 9, the diaphragm 76 constitutes one electrode of a double plate capacitor, the other electrode being the electrode 82 printed on the board 78. The dielectric sheet 84 is therefore between the two electrodes.

When a pressure is applied the diaphragm 76 reacts by bending to become concave. As the pressure is increased the centre of the diaphragm comes into contact with the dielectric sheet 84 which then partially supports the diaphragm 76. As the pressure increases, the area of the central portion of the diaphragm directly in contact with the dielectric sheet increases and thus the capacitance increases.

The pressure-capacitance characteristic approximates closely to a power function (as described earlier with reference to equation 5) from the point at which the diaphragm 76 first becomes supported on the dielectric sheet 84. The maximum pressure that can be applied is limited by the mechanical properties of the material of the diaphragm 76. If excessive pressure is applied and the stress on the diaphragm exceeds the elastic limit for the material, permanent deformation will occur and the sensor will cease to be accurate.

The following expression defines the limit of pressure that can be used:

$$P_{max} = \frac{1}{8} \cdot \frac{t}{h} \cdot \frac{\sigma_2^y}{E} \tag{18}$$

where $P_{max}$ is the maximum pressure, t is the thickness of the diaphragm, h is the height of the diaphragm above the dielectric sheet in the undeformed state, $\sigma_y$ is the yield stress (at the elastic limit) and E is the Young's modulus for the material.

This limit implies a maximum diameter of contact between the diaphragm and the dielectric. For a diaphragm of diameter D, the maximum contact diameter $d_{max}$ is given by $$d_{max} = D - 4 \cdot \sqrt{\frac{E \cdot t \cdot h}{\sigma_y}} \tag{19}$$

Applying formulae 18 and 19, a diaphragm made from phosphor-bronze with the following properties is considered suitable for use: Young's modulus E=110 GPa; yield stress $\sigma_y$=500 MPa.

A diaphragm 0.4 mm in thickness with a working diameter of 20 mm set at a height of 0.1 mm above the dielectric sheet 84 will take a maximum pressure of 5.5 bar. The range of capacitance will depend on the dielectric material used and its thickness. If it is typically 0.05 mm thick with a dielectric constant of 3, the capacitance can be expected to vary from 50 pF at zero pressure to 120 pF at 3 bar.

As expected, when the electrode 84 printed on the top side of the board 78 is circular (i.e. a disc) the pressure-capacitance characteristic is close to a power curve over a substantial pressure range. If desired, the pressure-capacitance characteristic can be modified by adjusting the shape of the electrode printed on the board, for example a clover-leaf shaped electrode could be used.

Figure 10:
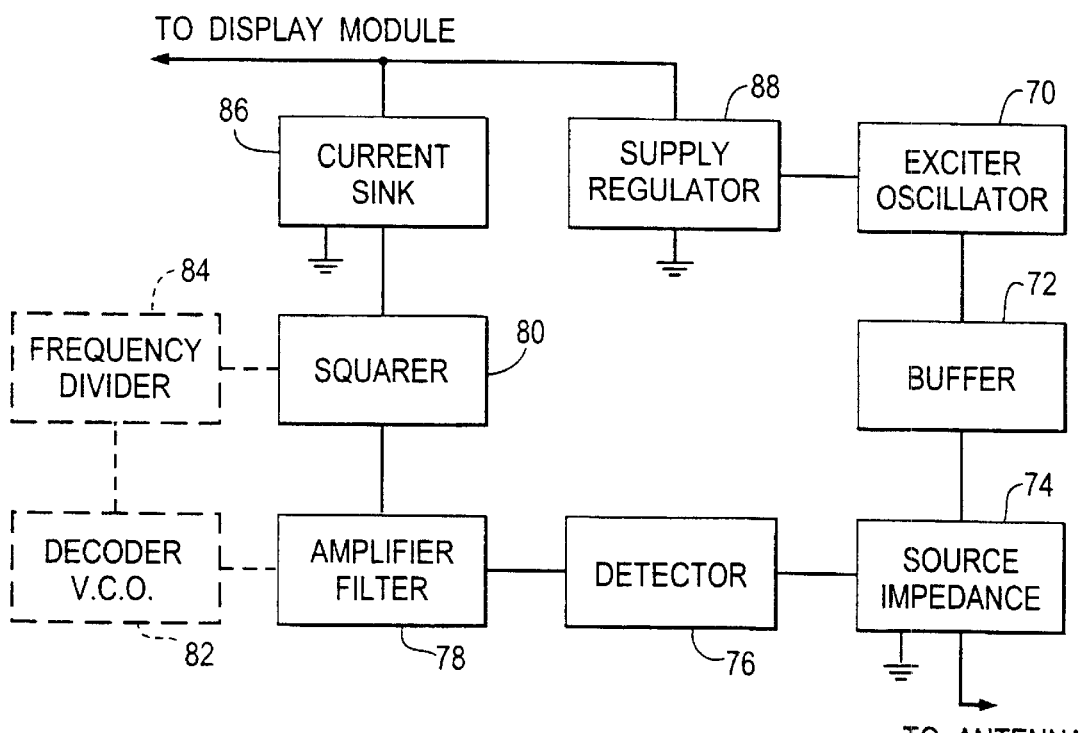
FIG. 10 shows a block circuit diagram of a relay module included in the FIG. 1 apparatus.

An example of the circuitry in the relay module is shown in block diagram form in FIG. 10. In FIG. 10, the relay module circuitry includes a driver section made up of an excitation oscillator 70, a buffer 72 connected to the excitation oscillator 70, and a source impedance 74 connected to the buffer 72. The source impedance 74 is in turn connected to the fixed antenna 3 associated with the relay module concerned.

The relay module circuitry further comprises a receiver section made up of a detector 76 connected to the source impedance 74, an amplifier/filter 78 connected to the detector 76, and a squarer 80 connected to the amplifier/filter 78. optionally, the receiver section may also comprise a decoder voltage-controlled-oscillator 82 (in the above-mentioned case in which the sensor module contains an intermediate oscillator—60 in FIG. 7) and/or a frequency divider 84.

Finally, the relay module circuitry comprises a power supply regulator and current control section made up of a current sink 86 connected to the squarer 80, and a supply regulator 88.

The three sections of the relay module circuitry in one embodiment of the present invention will now be described in more detail with reference to FIG. 11(A) to 11(C).

Figure 11A:
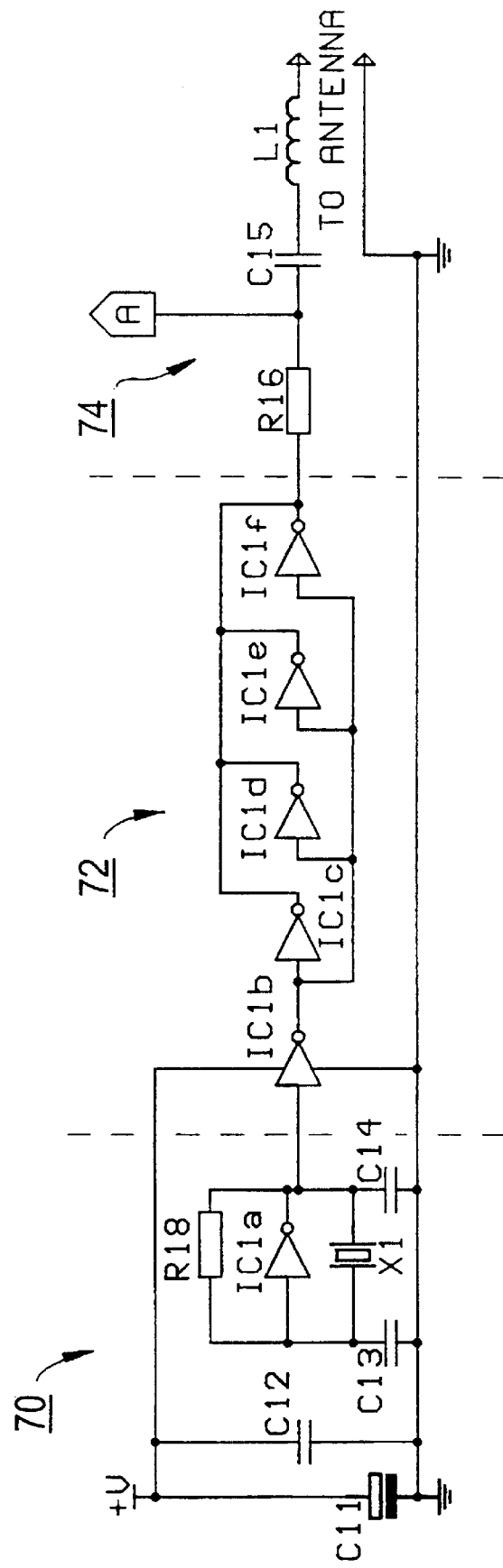
FIGS. 11(A) to 11(C) are detailed circuit diagrams corresponding to FIG. 10.

FIG. 11(A) shows the circuitry in the driver section. Exemplary components for the FIG. 11(A) driver section circuitry given in Table 3 below.

TABLE 3

| ELEMENT | VALUE |
|---------|-------|
| C11 | 47 uf 10 V or 16 V |
| C12 | 100 nF |
| C13 | 22 pF |
| C14 | 22 pF |
| C15 | 100 nF |
| IC1 | 74HC04 |
| L1 | 3.3 uH |
| R16 | 330 R |
| R18 | 1 M |
| X1 | 10 MHz |

The excitation oscillator 70 is constituted by inverter IC1a, together with a ceramic resonator X1, a resistor R18 and capacitors C13 and C14. The excitation oscillator 70 produces a output signal whose output frequency is determined by the resonant frequency of the ceramic resonator X1, for example 10 MHz in this embodiment.

The buffer 72 includes a driver inverter IC1b which squares the output signal of the oscillator 70 and four inverter elements IC1c to IC1f connected in parallel with one another to the output of the inverter IC1b.

One part of the source impedance 74 is provided by a series resistor R16 connected to the output of the buffer 72. The buffer output is connected via a DC-blocking capacitor C15 and optional inductor L1 to the fixed antenna 3. If inductive coupling, rather than capacitive coupling, is employed between the relay module and the sensor module, a differently-valued inductor is connected instead between the output and the fixed antenna.

Figure 11B:
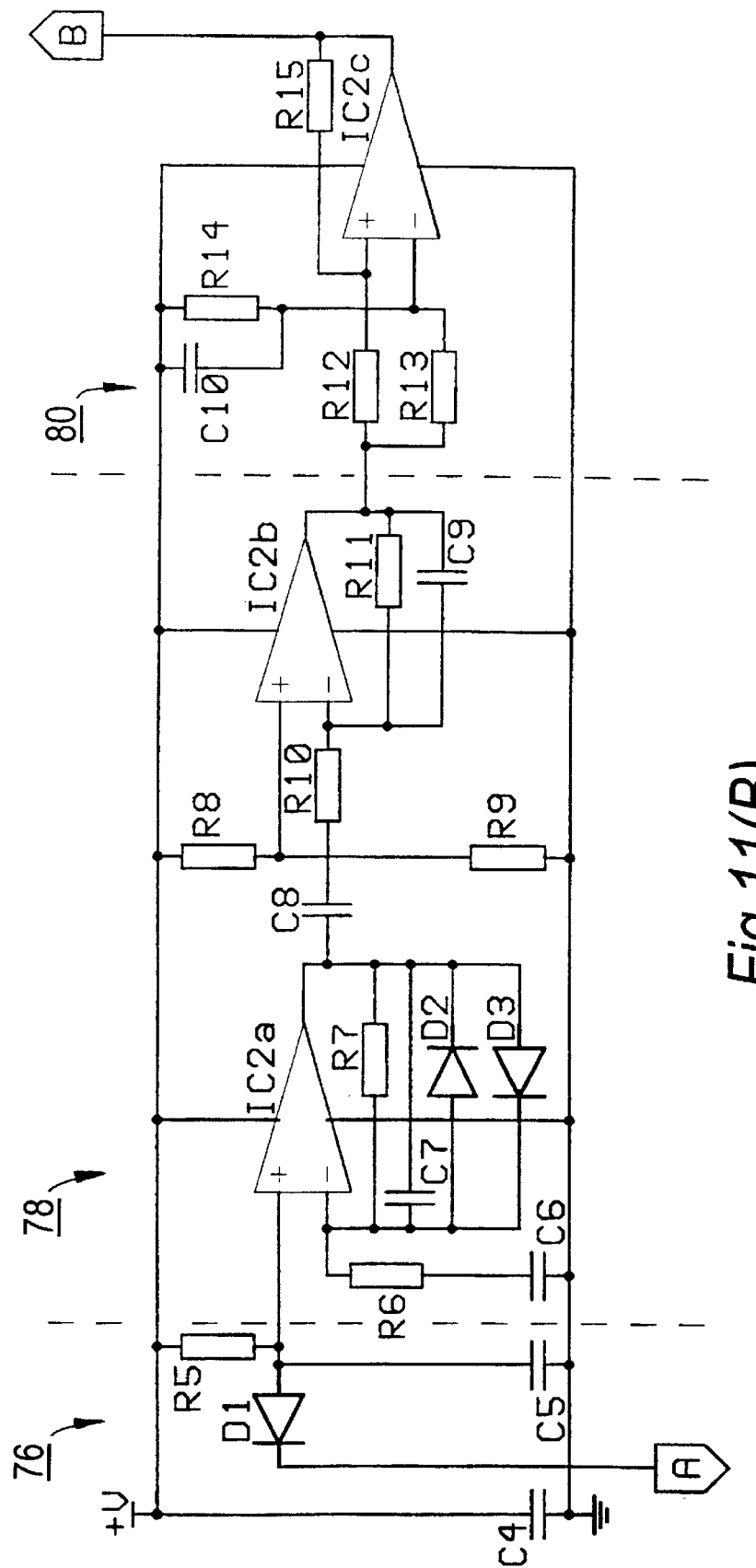

In the receiver section, shown in FIG. 11(B), the detector 76 is made up of a diode D1, capacitor C5 and resistor R5. The detector serves to detect the voltage envelope at the buffer output on the negative side of the excitation envelope.

The detection signal produced by the detector 76 is passed to the amplifier/filter 78. The amplifier/filter 78 has first and second amplification stages in series. The first stage, made up of resistors R6 and R7, capacitors C6 and C7, diodes D2 and D3 and operational amplifier IC2a, operates as a non-inverting amplifier having a voltage gain of approximately 11 at 15 kHz and includes filtering. Low-frequency rejection is achieved by the coupling capacitor C6, and high-frequency rejection is achieved by the feedback capacitor C7. The diodes D2 and D3 in the feedback loop provide limiting of high-level input signals.

The second amplification stage, made up of resistors R8 to R11, capacitors C8 and C9 and operational amplifier IC2b, operates as an inverting amplifier having a voltage gain of approximately 11 at 15 kHz. Again, the coupling capacitor C8 provides low-frequency rejection and the feedback capacitor C9 provides high-frequency rejection. The resistors R8 and R9 provide a voltage divider network for biasing the output of the second amplification stage to a potential of approximately one third of the supply voltage.

The output voltage of the amplifier/filter 78 is applied, via a resistor R12, to a further operational amplifier IC2c in the squarer 80. A resistor R15 provides IC2c with positive feedback.

The output of the squarer is connected to the current sink 86.

Exemplary components for the FIG. 11(B) receiver section are given in Table 4 below.

TABLE 4

| ELEMENT | VALUE |
|---------|-------|
| C4 | 1 uF |
| C5 | 4.7 nF |
| C6 | 2.2 nF |
| C7 | 100 pF |
| C8 | 2.2 nF |
| C9 | 100 pF |
| C10 | 100 nF |
| D1 | BAT17 |
| D2/D3 | BAV199 |
| IC2 | MC33204D |
| R5 | 24 K |
| R6 | 4.7 K |
| R7 | 100 K |
| R8 | 22 K |
| R9 | 12 K |
| R10 | 4.7 K |
| R11 | 100 K |
| R12 | 1 K |
| R13 | 10 K |
| R14 | 1 M |
| R15 | 100 K |

Figure 11C:
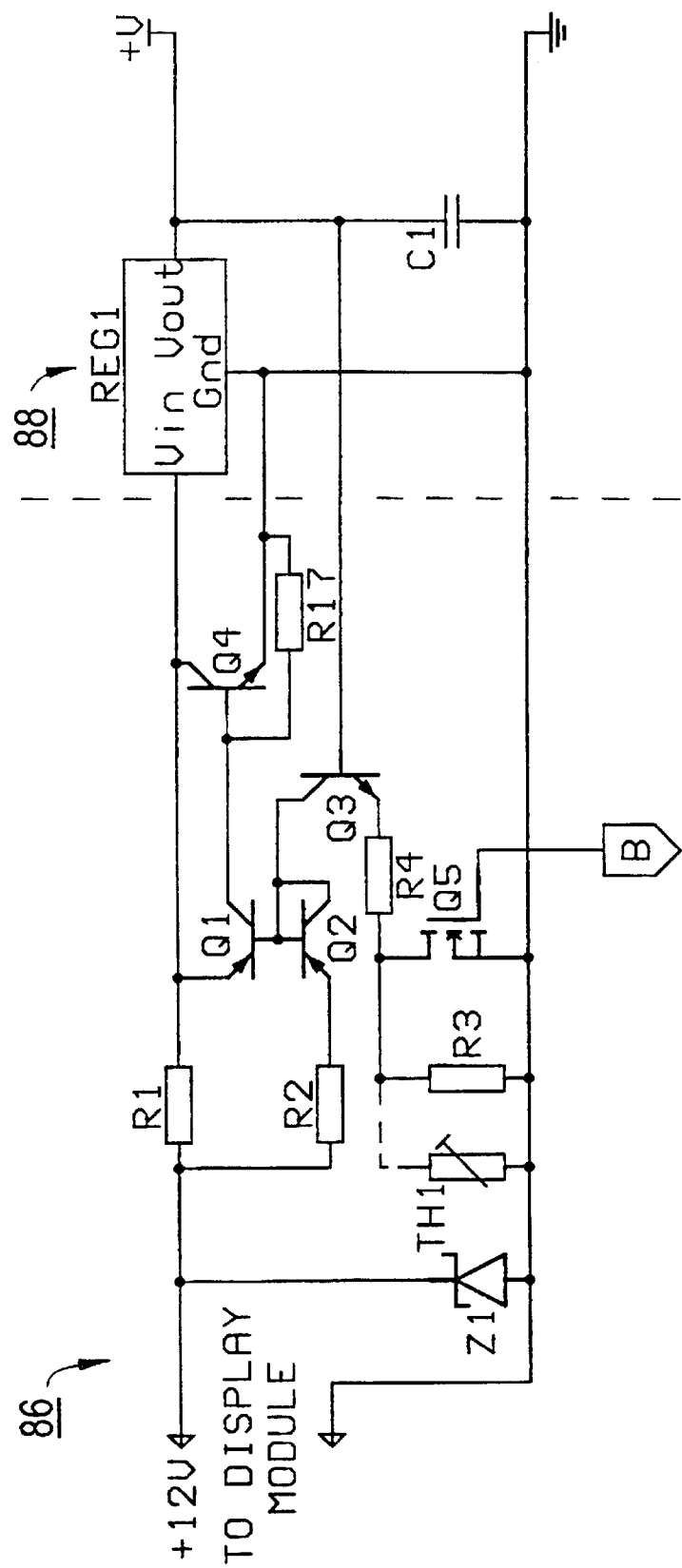

As shown in FIG. 11(C), the current sink 86 is made up of resistors R1 to R4 and R17, thermistor TH1, PNP bipolar transistors Q1 and Q2, NPN bipolar transistors Q3 and Q4 and n-channel FET Q5.

The transistors Q1 and Q2 are connected in a current mirror shunt configuration, the gain being set by the ratio between the resistors R1 and R2 at 100. The current mirror shunt is coupled by the transistor Q3 and resistor R4 to the parallel-connected thermistor TH1, resistor R3 and FET Q5. The gate of the FET Q5 is driven by the output of the squarer 80.

When the FET Q5 is turned off by the squarer output, no current passes through the transistor Q5 and the current that is sunk by the current sink 86 is a variable current determined by TH1 with R3 and R4. When Q5 is turned on by the squarer output, on the other hand, the drain of the FET Q5 becomes near to ground potential, so that a fixed current of approximately 1 mA flows through the current sink (the emitter potential of the transistor Q3 is fixed at approximately 4.3 volts because its base is tied to the supply voltage +V (=+5 volts in this embodiment), and the resistor R4 has a value of 4.3 kΩ. The transistor Q4 and resistor R17 serve as a bypass to limit the current passing through Q1. The current flowing through Q1 is approximately 1 mA to match the current flowing through Q2.

Whatever current is sunk through the transistor Q3 is amplified by a factor of 100 by the current mirror so that, when Q5 is turned on, a fixed high-level current of 100 mA is drawn through the current mirror, whereas when Q5 is turned off, a variable low-level current dependent on the ambient temperature, as measured by the thermistor TH1, is drawn.

The inclusion of the thermistor TH1 to measure ambient temperature is not an essential feature. For example, ambient temperature could be measured independently of the relay modules and supplied to the display module. Many vehicles already include ambient temperature sensors capable of providing ambient temperature information to the display module. It is, however, envisaged, for example, that the relay module for the spare wheel may prove to be a convenient location for the ambient temperature sensor, in which case a circuit (as in FIG. 11(C)) that draws a current proportional to (or dependent otherwise on) temperature can be used and the data transmitted to the display module through the hard wire link to the display module. A suitable decoder for use in the display module will be described later. If the relay module does not include an ambient temperature sensor, the current mirror shunt (current regulating shunt) can be omitted, as in this case the magnitude of the current sunk by the current sink 86 in the relay module is not relevant; only the frequency of variation of the current sunk is measured.

Finally, the power supply regulator and current control section shown in FIG. 11(C) comprises a standard integrated circuit voltage regular REG1 which derives the supply voltage (+5V) for the receiver and driver sections from the power supply voltage supplied to the relay module from the display module (+12V).

A capacitor C1 provides voltage decoupling and a Zener diode Z1 protects the relay module from excessive supply voltages.

Exemplary components for the FIG. 11(C) circuitry are given in Table 5 below.

TABLE 5

| ELEMENT | VALUE |
| --- | --- |
| C1 | 100 nF |
| Q1/Q2 | BCV62C |
| Q3 | BC846 |
| Q4 | BCP55 |
| Q5 | FDV301N |
| R1 | 4.7 R |
| R2 | 470 R |
| R3 | 7.5 K |
| R4 | 4.3 K |
| R17 | 680 R |
| REG1 | LM78L05 |
| TH1 | 4.7 K |
| Z1 | 14 V |

Figure 12A:
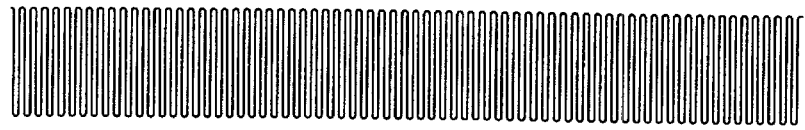
FIGS. 12(A) to 12(H) present waveforms produced in the FIG. 1 apparatus in operation thereof.

Operation of the relay module and sensor module is illustrated in the waveform diagrams of FIGS. 12(A) to 12(H). FIG. 12(A) shows the voltage applied to the fixed antenna 3 by the driver section of FIG. 11(A). The frequency (set by the ceramic resonator X1) is 10 MHz. The peak-to-peak amplitude is approximately 5V.

Figure 12B:
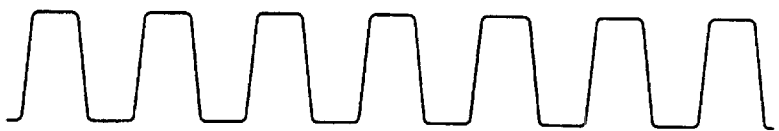

FIG. 12(B) shows the output voltage of the sensor oscillator 58 in the sensor module. This voltage has a frequency in the range from 10 kHz to 20 kHz dependent on the pressure P and temperature T measured by the pressure sensor S101 and thermistor T101 respectively. The peak-to-peak amplitude is approximately 3V. Incidentally, it will be appreciated that the waveform diagrams of FIG. 12 are only schematic and that in this embodiment the frequency of the voltage in FIG. 12(A) is between 50 and 100 times greater than the frequency of the voltage in FIG. 12(B).

Figure 12C:
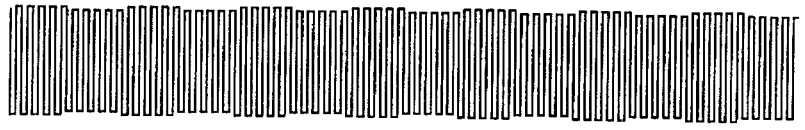

FIG. 12(C) shows the voltage developed across the resonator 52 in the sensor module. Referring back to FIG. 4, it can be seen that, although the capacitance of the resonator is modulated by the sensor oscillator output, the resonator voltage ($V_L$) does not vary significantly (for excitation frequencies in the range from 0.85 or less to 0.97 or more—but not 1.0 or higher —of the resonant frequency of the resonator 52). This means that a sufficiently high amount of power can be transmitted from the relay module to the sensor module irrespective of variations in the sensor oscillator output voltage. (N.B. the resonator voltages in FIG. 4 are normalised).

Figure 12D:
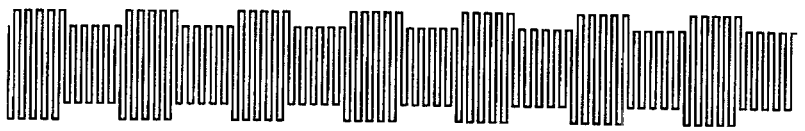

FIG. 12(D) shows the voltage developed at the junction between the source impedance R16 and the coupling capacitor C15 in the driver section of FIG. 11(A). Referring to FIG. 3, it can be seen that when the excitation frequency is within the range from lower than 0.85 to greater than 0.97 (but not 1.0 or more) times the resonant frequency of the resonator 52, a change in the resonator capacitance (as brought about by the modulator 62 at the sensor oscillator output frequency) can produce a measurable change in the voltage developed across the source impedance in the relay module driver section. The magnitude of the voltage variation is not relevant in this embodiment; the quantity that is being measured is its frequency of variation.

Figure 12E:

In FIG. 12(E) the detection signal produced by the detector 76 in the relay-module receiver section (FIG. 11(B)) is shown. Because of the diode D1 in the detector 76, the detector 76 detects the negative envelope of the voltage at the source impedance R16. Typically, the peak-to-peak variation in the output voltage of the detector 76 is 2.5% of the excitation voltage for a 1k change in the resonator capacitance.

Figure 12F:
Figure 12G:
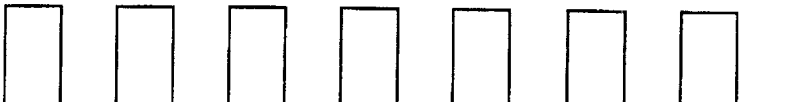

FIG. 12(F) shows the output voltage of the amplifier/filter 78 in the receiver section, and FIG. 12(G) shows the output voltage of the squarer 80.

Figure 12H:
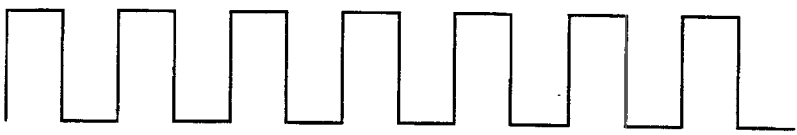

Finally, FIG. 12(H) shows the current drawn by the relay module; as explained hereinafter, the frequency (and possibly also the magnitude) of the variation of the current drawn is the quantity that is measured by the display module. The current drawn is modulated between a fixed, high value of approximately 100 mA and a variable, low value (shown in the FIG. as 40 mA, by way of example) dependent on ambient temperature as measured in the relay module.

In a case where an intermediate oscillator is provided in the sensor module, the desired signal representing the measured quotient p must be retrieved by demodulation of the sub-carrier. Assuming the sub-carrier is frequency modulated, a phase-locked-loop (PLL) method of demodulation is most appropriate. The output from the squarer 80 is supplied to a phase-locked-loop circuit and is compared with the output of a voltage-controlled oscillator (VCO) (82 in FIG. 10). A difference signal is generated to adjust the frequency of the VCO to maintain phase locking between the squarer and VCO output signals. The VCO control voltage is then a copy of the original modulating signal. This is amplified and squared and drives the current sink 86.

A digital divider (84 in FIG. 10) can be added between the squarer 80 and the current sink 86 to reduce the frequency of signal between the relay module and the display module. This may be desirable if the connection between the modules is likely to be prone to noise in the frequency band of the signal.

FIG. 13 shows a block diagram showing one example of the circuitry in the display module 5 in an embodiment of the present invention. The circuitry comprises a power regulator 90, a clock oscillator 92, a microcontroller 94, a multiplexer 96, signal converters 98, and a display 100. optionally, a sounder 102 and an ambient pressure sensor circuit 104 may be provided.

The microcontroller 94 incorporates at least a counter for frequency measurement purposes, and an analog-to-digital section (ADC) for measurement of ambient temperature. The microcontroller must have sufficient outputs to control the multiplexer 96 and to drive the display 100.

The multiplexer 96 is a multi-input/single-output standard digital multiplexer with as many inputs as there are relay modules (a further input may be required for an ambient pressure sensor circuit 104).

One of the signal converters 98 is assigned to each of the relay modules. As indicated above, the output signal of each relay module is passed as a current signal on the power supply line to the relay module concerned. Each signal converter in the display module is therefore required to convert the current signal into a voltage signal for input, via the multiplexer 96, to the microcontroller 94.

The design of the signal converter depends on the type of current signal produced by the relay module. If the relay module produces only a digital output signal of the same frequency as (or, if a frequency divider is used in the relay module, a predetermined fraction of) the sensor oscillator frequency, a signal converter of the kind shown in FIG. 14 can be used. Exemplary component values for use in the FIG. 14 signal converter are given in Table 6 below.

TABLE 6

| ELEMENT | VALUE |
| --- | --- |
| Q201 | BC77 |
| R201 | 8.2 R |
| R202 | 6.8 K |
| R203 | 5.1 K |
| R204 | 3.3 K |

In the FIG. 14 circuit an in-line current sensing resistor R201 provides sufficient base-emitter voltage to turn on a PNP transistor Q201 when the current drawn by the relay module exceeds a predetermined threshold value, in this case around 75 mA. An input signal INPUT for application to the microcontroller 94 (via the multiplexer 96) is derived from the collector of the transistor Q201 after potential dividing by resistors R202 and R203. A diode D201 provides over-voltage protection for the INPUT signal.

If the relay module produces an analog current signal (e.g. a current signal dependent on ambient temperature as in the FIG. 11(C) circuit) additional circuitry as shown in FIG. 15 can be included in the FIG. 14 signal converter. Two alternative exemplary component lists for use in the FIG. 15 circuitry are given in Table 7 below.

TABLE 7

| ELEMENT | EXAMPLE LIST 1 | EXAMPLE LIST 2 |
| --- | --- | --- |
| C301 | 100 nF | 100 nF |
| C302 | 10 uF | 47 uF |
| Q301 | BC177 | BCV62 |
| Q302 | BC177 | BCV62 |
| R301 | 10 R | 4.7 R |
| R302 | 1 K | 470 R |
| R303 | 10 K | 10 K |
| R304 | 100 K | 22 K |

The FIG. 15 circuitry senses a minimum current flowing in a line that carries a DC current and an AC current (it is not permitted for the current flowing to reverse in direction), and produces a voltage proportional to that sensed minimum current. Transistors Q301 and Q302 form a 100:1 ratio current mirror by virtue of the resistance ratio of their respective emitter resistors R302 and R301. The transistor Q302 and a capacitor C302 and a resistor R304 together form a negative envelope detector. In this detector Q302 functions effectively as a diode. Only the low-level current flowing through R301 is sensed because C302 maintains an essentially constant base voltage on Q301 and Q302, relative to the supply line potential, so that when the current through R301 is increased Q302 turns off for a short period so there is no change in the base bias to the transistors. Q301 continues to conduct at a level appropriate to the low-level current. The collector current of Q301 is converted to a voltage by a resistor R303. This voltage is supplied, in addition to the INPUT signal produced by the basic FIG. 14 signal converter, to the microcontroller 94. The Q301 collector current is 1/100th of the low-level current flowing through R301 so the voltage across R303 is 1/100 mV/mA of that low-level current.

If an ambient pressure sensing circuit (104 in FIG. 13) is used, this may advantageously be in the same form as the sensor oscillator 34 in the sensor module. In this case, the square-wave output of the ambient pressure sensor circuit can be applied to a further input of the multiplexer directly, and no intermediate signal converter is required.

The microcontroller 94 receives the signal-converted INPUT signals from the relay modules in turn by sequencing the multiplexer 96. The signals are fed to an internal counter which counts the number of cycles over a fixed interval. Each signal is thus converted into a digital value representing frequency. A look-up table is then used to convert this digital value into the corresponding value of pressure-temperature quotient ρ, based on equation 7 above. In the case of a relay module that additionally produces an analog current signal representing ambient temperature, the analog voltage produced by the additional circuitry of FIG. 15 is also converted by the microcontroller's internal ADC into a digital value of ambient temperature $T_a$. The gauge pressure for each sensor module is then derived from the quotient ρ, the ambient temperature $T_a$ and the ambient pressure $P_a$ using equation 1 above. The gauge pressure value $P_g$ is thus available for output as a digital value, or can be converted by the microcontroller 94 into whatever form of output signal is required.

The microcontroller functions can be incorporated into an existing on-board microcontroller or microcomputer if desired, provided that this has the necessary resources.

The power regulator 90 may be a standard monolithic regulator, capable of providing a clean regulated supply for the microcontroller and supporting circuitry.

The clock oscillator 92 is required to provide a reference frequency signal for counting purposes and therefore its accuracy affects the accuracy of measurements. Accordingly, a crystal or ceramic resonator is preferred for use in the clock oscillator 92, with the oscillator amplifier circuitry being incorporated conveniently in the microcontroller 94.

For the display 100, any suitable type of display can be used (LCD, LED, plasma, etc.), preferably driven directly from the microcontroller 94. The form of the display can be numerical or by bar chart or simply as fault warnings or any combination of these to suit the vehicle designer's preference.

If desired, the sounder 102 may be provided to give an audible warning in the event that the measured gauge pressure is below or above a threshold. The sounder may, for example, be a piezo-electric transducer driven directly by the microcontroller. Alternatively, the microcontroller could produce an audio output triggering signal for triggering an existing on-board audio warning device.

It will be appreciated that many modifications and variations are possible on the arrangements described hereinbefore. Some of these will now be described, by way of example, below.

On vehicles, such as heavy commercial vehicles, where two wheels are mounted on a common stub axle, the antennae arrangement shown in FIG. 6 will be inappropriate. The requirement for interchangeability of wheels remains, but steered wheels are usually single whereas driven or load-bearing wheels are often twin.

In this case, it is preferable to employ a link, between the sensor module and the wheel antenna, that is attached after the wheel is mounted. Coaxial cables with connectors at each end can be removed prior to dismounting the wheel and replaced after remounting. An arrangement of this kind is shown in FIG. 16.

Figure 16:
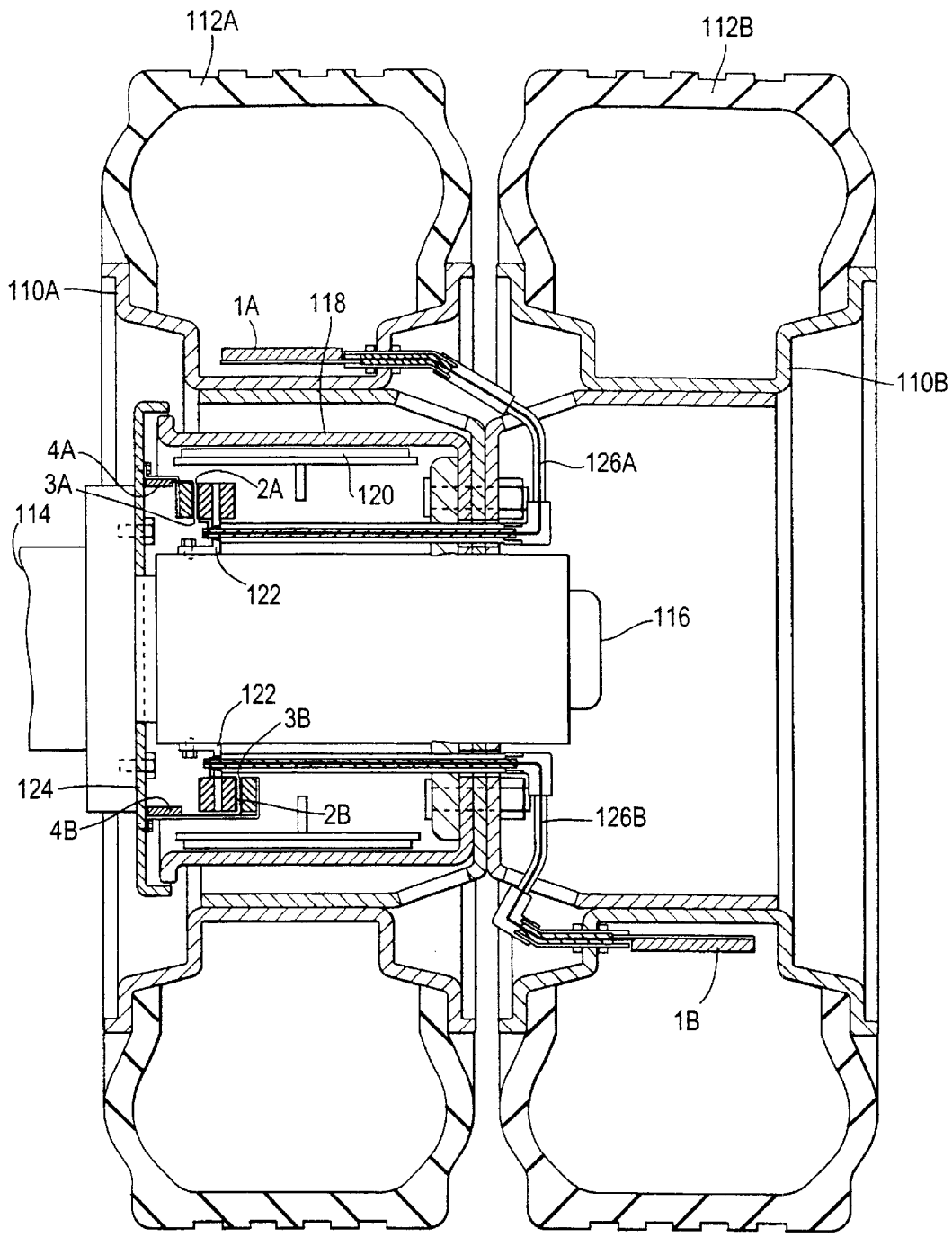
FIG. 16 shows a schematic cross-sectional view of a multi-wheel axle vehicle arrangement, for use in explaining a physical arrangement of parts of the FIG. 1 apparatus in another embodiment of the present invention.

In FIG. 16 a multi-wheel axle arrangement is shown having two wheels 110A and 110B, each having an associated tyre 112A or 112B. The wheels are mounted on a common axle 114 having a hub 116. A brake drum 118 enclosing a brake shoe 120 is accommodated in the central area of the inner wheel 112A.

In this arrangement, separate wheel antennae 2A and 2B are required for the two wheels 112A and 112B respectively and these are contained within the brake drum 118. The two wheel antennae 2A and 2B are mounted on opposite faces respectively of a disk-shaped carrier 122 which is mounted on the hub 116. Each wheel antenna 2A or 2B has an associated, opposed, fixed antenna 3A or 3B. These fixed antennae are mounted, with their respective relay modules 4A and 4B, on a brake back plate 124. As shown, the fixed antenna 3A is on the inside of its associated wheel antenna 2A, whereas the fixed antenna 3B is on the outside of its associated wheel antenna 2B. Each wheel antenna has a coaxial cable connection 126A or 126B to its associated sensor module 1A or 1B. The connections 126A and 126B are made via holes in the hub flange, in the brake drum and in the wheel discs. Alternatively, via holes may be made through the central axes of special wheel studs. Connections (not shown) from the relay modules 4A and 4B to the display module 5 (also not shown) are via holes (not shown) in the brake back plate 124.

The FIG. 16 arrangement can also be used with a single wheel. A similar arrangement can be used with disc brakes.

In the FIG. 7 embodiment described above, the sensor module has only one item of data to transmit to the relay module. If transmission of more than one item of data is required, time-division-multiplexing can be used, as shown schematically in FIG. 17.

Figure 17:
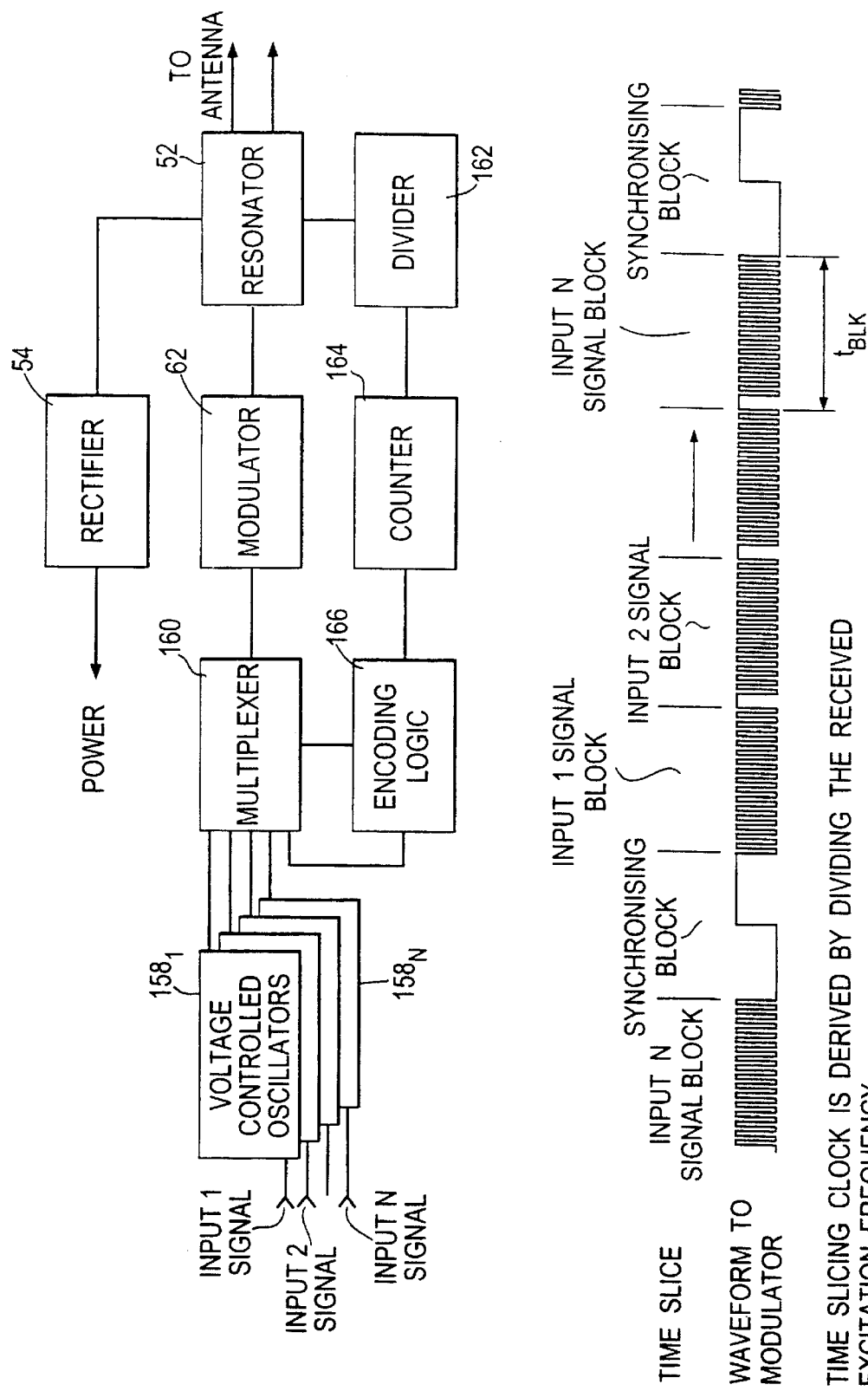
FIG. 17 shows a block circuit diagram of a modified sensor module for use in the FIG. 1 apparatus.

The modified sensor module shown in FIG. 17 includes a resonator 52, rectifier 54 and modulator 62, as in the sensor module circuitry shown in FIG. 7.

In place of the sensor oscillator 58 in FIG. 7, the modified sensor module of FIG. 17 includes N voltage-controlled-oscillators (VCOs) $158_1$, to $158_N$. Each VCO 158 receives an associated input signal which it is desired to transmit to the relay module. The input signal controls the oscillation frequency of the VCO concerned. The VCO outputs are connected to respective inputs of a multiplexer 160.

The sensor module of FIG. 17 also comprises a divider 162 connected to the resonator 52, a counter 164 connected to the divider 162, and an encoding logic circuit 166 connected to the counter 164 and also connected to the multiplexer 160 for applying an N+1th input signal and a control signal thereto.

The divider 162 uses the resonator excitation frequency as a reference frequency and divides this by an appropriate factor to produce a clock signal which is applied to the counter 164. The counter 164 counts a predetermined number of pulses of the clock signal and then increments its output. Thus, the counter produces an output signal having a period $t_{blk}$, corresponding to one block duration of the time-slice multiplexing. In the encoding logic circuit 166, a control signal pulse is applied to the multiplexer 160 in response to each output-signal pulse of the counter 164. At every N+1th output-signal pulse of the counter 164 the encoding logic applies a synchronising block signal to the N+1th data input of the multiplexer 160. Thus, the N data inputs to the multiplexer 160 are selected in turn, each of them being allocated the block duration $t_{blk}$. After the N blocks follows a synchronising block, also of duration $t_{blk}$, provided by the encoding logic circuit 166.

The synchronising block is used by decoding logic in the display module to reconstruct the data appropriate to each input signal.

In the case of a trailer, particularly one with many wheels, a separate connection between tractor and trailer for each wheel can be avoided by applying multiplexing to the relay modules. This can reduce the connections to a single wire plus an earth return. The multiplexer, normally contained in the display module, is in this case built into a separate unit that is mounted on the trailer. This unit generates a reference signal to synchronise the time-slicing and powers each relay in turn. As many as 40 wheels per second could be checked without significant loss of accuracy.

In place of the signal converter circuit shown in FIG. 14 it is also possible to use an opto-isolator comprising a light emitting diode (LED) and phototransistor. In this case, the LED may be connected in parallel with an in-line current sensing resistor such that the voltage drop across the resistor at the appropriate threshold current is equal to the diode voltage drop of the LED. Then, the phototransistor, connected with a collector load, will conduct when the threshold current is exceeded.

Any suitable type of resonator can be used. If an active component (instead of a passive component) is used in the resonator the value of the component which influences the resonant frequency of the resonator may be an effective value obtaining only in use, rather than a permanent or real value. For example, a modulator could utilise the Miller effect by connecting a capacitor between the negative input and the output of an amplifier. In this case, the effective capacitance as seen at the input is multiplied by the gain of the amplifier. In a modulator a variable gain amplifier can be constructed in which only a current is changed; all component values themselves remain unchanged.

Instead of a plate-form antenna, described above in the case of capacitive coupling, any form of antenna can be used, for example a conductive brush or a wire mesh. The antenna can be flexible, for example as described later with reference to FIG. 19.

The modulator 62 may, as mentioned above, be implemented by using a varicap diode but there will be some mixing of the modulation signal with the resonator voltage in this case.

In a case where only a square-wave signal is to be transmitted, additional reactance may be switched into the resonator to perform modulation. Switching in small values of capacitance, although theoretically conceivable, may prove difficult in practice because of the output capacitance of the switching transistor. This problem can be overcome by switching in additional inductance.

In the relay module, a filter may be included between the excitation oscillator 70 and the buffer 72 to improve sine-wave purity if particularly stringent constraints on EMC emissions due to harmonics are imposed. In this case, the buffer 72 would need to be implemented as a linear amplifier, rather than as a digital circuit.

It is also possible to link the relay module and sensor module by inductive coupling, i.e. using two inductively-linked coils as in a transformer. In this case, the inductive element of the load impedance $Z_L$ is due to the leakage inductance of the transformer. With loosely coupled coils this can be quite large and variable. By including an additional series inductor as part of the link (see, for example, FIG. 11(A)), the variations in leakage inductance may be swamped and theory analogous to that for capacitive coupling can then be applied. In this case, the excitation frequency will be higher than the natural resonant frequency of the load resonator. Greater power can generally be transmitted and the overall impedance can be lower than for capacitive coupling.

It is also possible to link the transmitter (sensor module) and receiver (relay module) using a hard-wire link with, for example, a fixed inductor included in the hard-wire link. Such an arrangement could be used, for example, to link a remote control console to its host unit, the remote control console requiring power from the host unit and transmitting one or more control signals to the host unit. The hard-wire link could be, for example, a single coaxial cable.

Next, an extension of the detuned resonator principle will be described which can provide for bi-directional signalling. When a detuned resonator circuit is operated there exists an excitation frequency at which the voltage on the load resonator reaches a maximum. Operating around this point there is very little change in load voltage with small variations in the reactive components of the resonator, while at the same time there is substantial change in the load current.

For example, operating at this frequency a ±2% change in resonator capacitance C can provide a ±10% change in load current but only a −0.5% change in load voltage. This means the change in current is forty times the change in voltage.

This property can enable the resonator to act as a receiver of incoming signals which vary the voltage without confusion with outgoing signals which vary only the current.

If the excitation voltage is amplitude modulated with a signal which it is desired to transmit from the source to the load, this desired signal can be recovered at the load by detection with a standard voltage amplitude detector. Signals can be transmitted simultaneously from the load to the source without confusion at the load resonator.

The signal detected at the source resistance will be a mixture of both the current signal from the load resonator and the voltage signal supplied by the source. However, if the sensing signal taken from the source resistance is demodulated with the desired signal being transmitted from the source to the load, prior to the sensing signal being passed to the detection circuitry at the source, the outgoing signal from the source will be rejected and the incoming signal from the load recovered.

Thus, bi-directional simultaneous signalling can occur without the need for frequency shifting or multiplexing, using full bandwidth in both directions.

Figure 18:
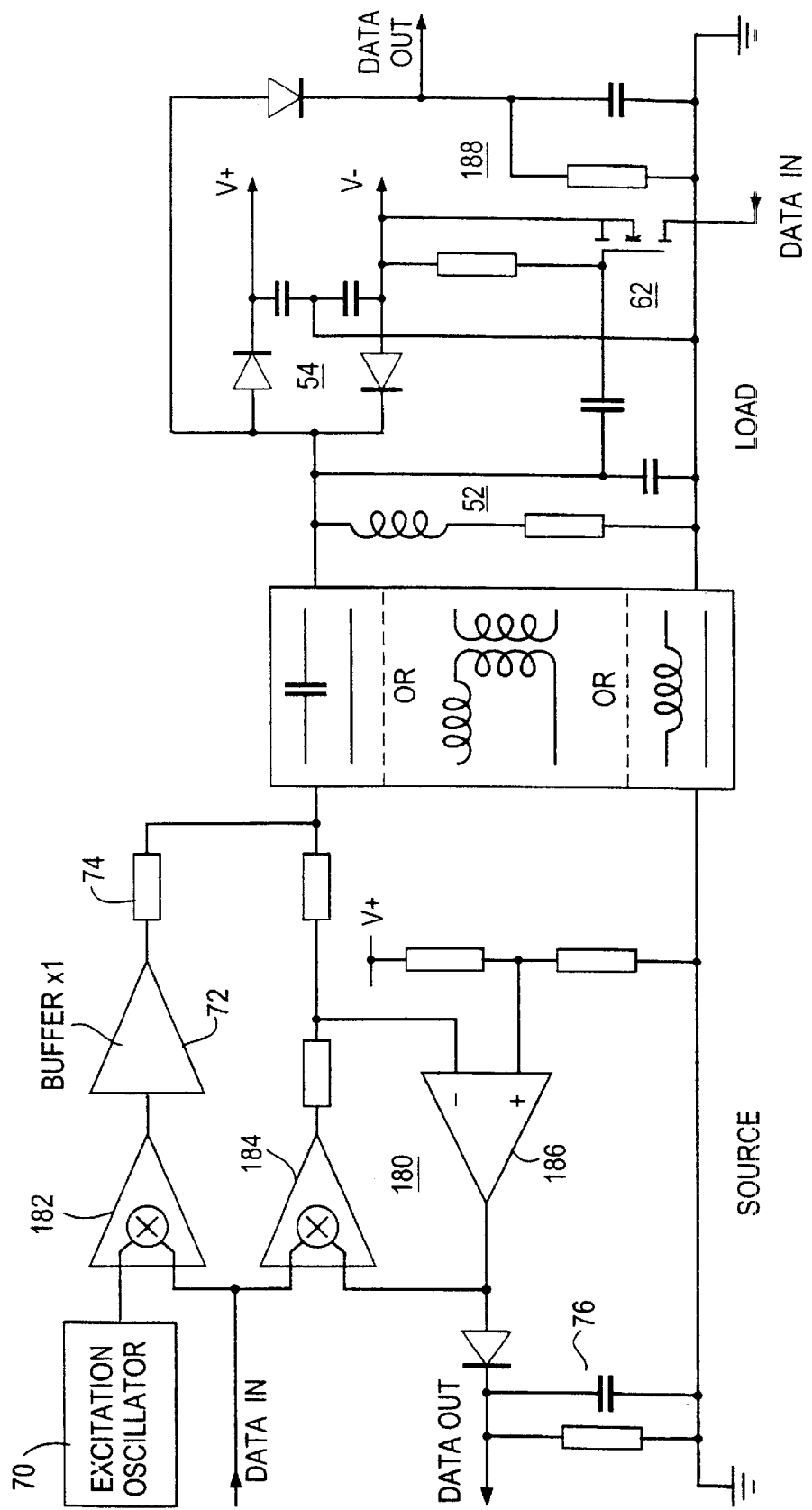
FIG. 18 shows a schematic circuit diagram of signal transmission apparatus according to another aspect of the present invention.

FIG. 18 shows a block circuit diagram of an arrangement in which the relay (source) and sensor (load) modules are modified to permit bi-directional signal transfer. In FIG. 18, a modulator 182 is interposed between the excitation oscillator 70 and the driver 72 in the source. The modulator 182 includes an analog multiplier which modulates the amplitude of the excitation signal produced by the excitation oscillator in accordance with a signal DATA IN which it is desired to transmit to the load. As described previously, the amplitude-modulated excitation signal is buffered and supplied via a source resistor 74 to the reactive link coupling the source to the load.

At the load, a detector 188 is included which detects the voltage envelope across the resonator 52 to produce a detection signal DATA OUT from which the signal DATA IN applied to the modulator 182 in the source can be derived.

The voltage across the source resistor 74 is sensed and applied to an inverting input of an inverting amplifier 186 in a demodulator 180. A non-inverting input of the amplifier 186 is set to a predetermined bias potential. The demodulator 180 also includes a further analog multiplier 184, corresponding to the analog multiplier in the modulator 182, connected in the feedback loop around the amplifier 186.

The analog multiplier 184 in the demodulator 180 also receives the DATA IN signal, and accordingly the amplifier 186 operates as an analog divider. The sensing signal produced at the output of the amplifier 186, which sensing signal is used for subsequent detection purposes in the source, is therefore not affected by the amplitude modulation of the excitation signal.

The FIG. 18 circuit is applicable to any type of reactive link (capacitive or inductive) provided that the is appropriate detuning between the excitation frequency and the load resonator is used.

Instead of simultaneous bidirectional signalling it would be possible to use time-division multiplexing in which the relay module would transmit to the sensor module in one phase and then the sensor module would transmit to the relay module in the next phase. In this case the demodulator in the relay module could be omitted as detection in the relay module of the incoming signal would not be affected by amplitude modulation of the outgoing signal.

Furthermore a bidirectional system could be produced in which one relay module is coupled simultaneously to more than one sensor module. In this case, it is not necessary for every one of the sensor modules to include a detector (188 in FIG. 18). Only some of the sensor modules, requiring the facility to receive signals from the relay module, might have such a detector.

Component tolerances are more critical when bi-directional signal transfer is to be performed if the incoming and outgoing signal separation at the load is to operate satisfactorily.

The bi-directional signal transfer can also be used with a hard-wire link between the source and the load. In this case, for example, a remote control console which has both control and status display functions (such as a keypad with status indication) could be connected to a host unit with just a single coaxial cable.

The signal transmission technique described above in relation to tyre pressure measurement can also be used to advantage in a number of other applications. The ability of circuits incorporating a detuned resonator to transmit data simultaneously in both directions can be used not only to reduce system complexity but also to provide security. A detuned resonator circuit also reduces cost when used for single-direction data transmission because of its inherent tolerance to component-value variations. Although it is more suited to low-power applications, the very localised field and EMC immunity of low-power electric field (capacitive) coupling, allied to the simplicity and freedom of the antennae design, gives the capacitive coupling technique major advantages over existing magnetically-coupled transmission systems.

A number of further applications of the signal transmission technique embodying the present invention will now be described briefly.

Firstly, the powering of, and transmission of data to and from, many types of sensors on rotating or reciprocating parts of mechanical equipment always presents problems. A coupling method embodying the present invention is applicable generally to all such applications and provides the features of being non-contact, localised and highly-immune to electro-magnetic interference. The method is also capable of operation in wet and oily environments. For example, the technique can be applied to measurement of torque transmitted via a rotating shaft. Strain gauges mounted on the shaft, along with signal conditioning circuitry and the relevant sensor module circuitry, can be powered and sensed using the coupling method with antennae concentric with the shaft.

Secondly, embodiments of the present information can provide secure data transmission. When a detuned resonator circuit is used to transmit data bi-directionally, the two data signals are effectively multiplied together as a mixed signal. At the source the outgoing and incoming signals are mixed together. To separate the incoming signal from the outgoing signal it is therefore necessary to effectively divide the mixed signal by the known outgoing signal. Without the locally-available information at the source regarding the outgoing signal the mixed signal cannot be separated. This means that the connection between the source and the link reactance is data secure when two signals are being transmitted.

Applications which require this form of security over wire links can also be provided by embodiments of the present invention. For example, in a system where data is to be transmitted securely from source to load, the load can be powered by the incoming transmission and can be modulated with a locally-generated random signal that will effectively secure the connection.

Embodiments of the present invention can also provide electronic keys and locks. A key based on the sensor module can be of the non-contact type and will not require batteries.

For example, a key circuit can be based around one or more sequencing counters which transmit a coded sequence in response to one or more received sequences. If several sequences are used and the transmission of each sequence is dependent on satisfactory completion of the previous call and response, neither the lock nor the key can be interrogated independently to uncover the key sequences being used. Because close coupling is used, interception of the sequences would not be possible. Additionally, the use of simultaneous bi-directional data transfer could be used to provide even greater security against the interception of signals.

Several different keys could be used with a particular lock, and each individual key could be identified. Standard encryption algorithms can be used. Reprogrammable keys could be made using EEPROM technology, so that the coding is changed with every use.

Embodiments of the present invention are also suitable for use in tagging applications where it is not practical to bring the key to the lock but where the lock can be brought to the key, for example with a hand-held reader.

Embodiments of the present invention can also be applied to so-called smart cards. These are cards with built-in integrated circuit chips. Conventionally, these cards have used electrical contacts for power and signal transmissions between the card and a card reader. Inductive coupling has been considered for use as a non-contact method of achieving these functions but to operate this successfully, correct alignment of the coupling coils must be achieved, which is difficult in practice.

In an embodiment of the present invention applied to a smart card, capacitive coupling can be used to provide a wider positioning tolerance when the card is coupled to the card reader. Furthermore, because capacitive coupling relies on an electric field which is less pervasive than a magnetic field, a capacitive coupling would be less prone to electromagnetic interference. The ability of detuned resonator circuits to pass signals bi-directionally and simultaneously could also be employed to advantage on smart cards.

Because embodiments of the present invention employ a non-contact form of coupling and the antennae can be insulated, such embodiments are suitable for use, either for sensing purposes or for control purposes, in areas which must be intrinsically safe. Embodiments of the invention are particularly suitable for use in applications where fluid sealing is a problem, as the source and the load can each be independently sealed. Where mechanical vibration is a problem and contact methods might be prone to fracture due to fatigue or to failure induced by tribological effects such as static build-up, a non-contact system embodying the present invention can provide a simple solution.

Other embodiments of the present invention can be applied to pointing devices such as a computer mouse. In this case, a cordless computer mouse, incorporating one antenna, is movable over a mouse pad incorporating a fixed antenna. The mouse pad has a hard-wire connection to the computer. Standard mouse technology can be used with the addition of encoding circuitry in the mouse and decoding circuitry in the mouse pad. In one possible implementation, the link technology can be extended by using a three-phase drive connected to strip antennae in the pad. The mouse has two antennae to complete the circuit, for example a primary circular antenna concentric with an annular return antenna.

The antennae are arranged so that the inner one of the mouse antennae has a diameter equivalent to one strip of the fixed antennae in the pad. The return antenna has a mean annular diameter equal to three times the pitch of the fixed antennae strips and a radial width equivalent to one strip. In this way, the two antennae on the mouse are subject to a single phase of fixed voltage.

To detect the return signal, three separate detectors are used, one on each phase, and the signals are then summed to give a single signal that is independent of the balance between the phases at any given time.

There are other applications in which it is advantageous to have a manual input device which has no hard-wire coupling to its host unit. An embodiment of the present invention can be applied to connect unpowered manual input devices such as keypads to powered host equipment. This may be desirable for safety or security reasons, such as maintenance-only access, protection against abuse etc. In one embodiment, a keypad matrix is connected to an encoder that transmits a coded signal to represent the pressing of a key. The keypad only has to be brought into close proximity to the antennae surfaces to operate.

Similarly, remote wire-linked consoles are commonly used to control and receive status information from host equipment. Such consoles are powered by the equipment they serve and usually require separate wire connections for power and for signals in each direction. This can be reduced to a single coaxial or twisted pair cable by use of an embodiment of the present invention, substantially reducing cabling costs and complexity.

Another embodiment of the present invention can be applied to pressure sensing in buoyancy compartments of rigid inflatable boats (RIBs) and other inflatables.

RIBs are typically constructed with a rigid base to the hull and a number of inflatable compartments, or air chambers, which form the sides of the hull. These boats have inherent buoyancy, provided that they remain inflated, and unlike a traditional hull can be relied upon to stay afloat even if they ship large quantities of water.

RIBs are widely used as pleasure craft and for coastguard duties. The inflatable sides of the hull make them particularly suitable where there is a high risk of collision and so RIBs are commonly used for off-shore rescue work.

The inflatable compartments on these vessels are usually inflated to a pressure between 0.2 and 0.5 bar and the pressure must be checked regularly to ensure proper inflation. In the event of a compartment leaking air, buoyancy will be maintained down to quite low pressures, but the structural integrity of the vessel may suffer.

The gas-permeability of the air chamber membrane is such that pressure will not be maintained indefinitely. Accurate pressure monitoring can give advanced warning of excessive leakage and can indicate which compartments need attention. Thus, in a preferred embodiment of the present invention, each compartment will be subject to continuous pressure sensing, and a central status display will be provided at the cockpit or bridge of the vessel, so as to reduce maintenance costs and provide a safety warning.

Although it would be possible to incorporate pressure sensing equipment in the compartment valves on some vessels, in many situations this is an inappropriate place to site such equipment because it may interfere with the inflation operation and jeopardise the integrity of the valve. An embodiment of the present invention can provide solutions to these problems as the sensor can be placed within the compartment away from the valve at any convenient point, and power and data can be transmitted through the air chamber membrane without any alterations to the structural integrity of the compartment.

Figure 19:
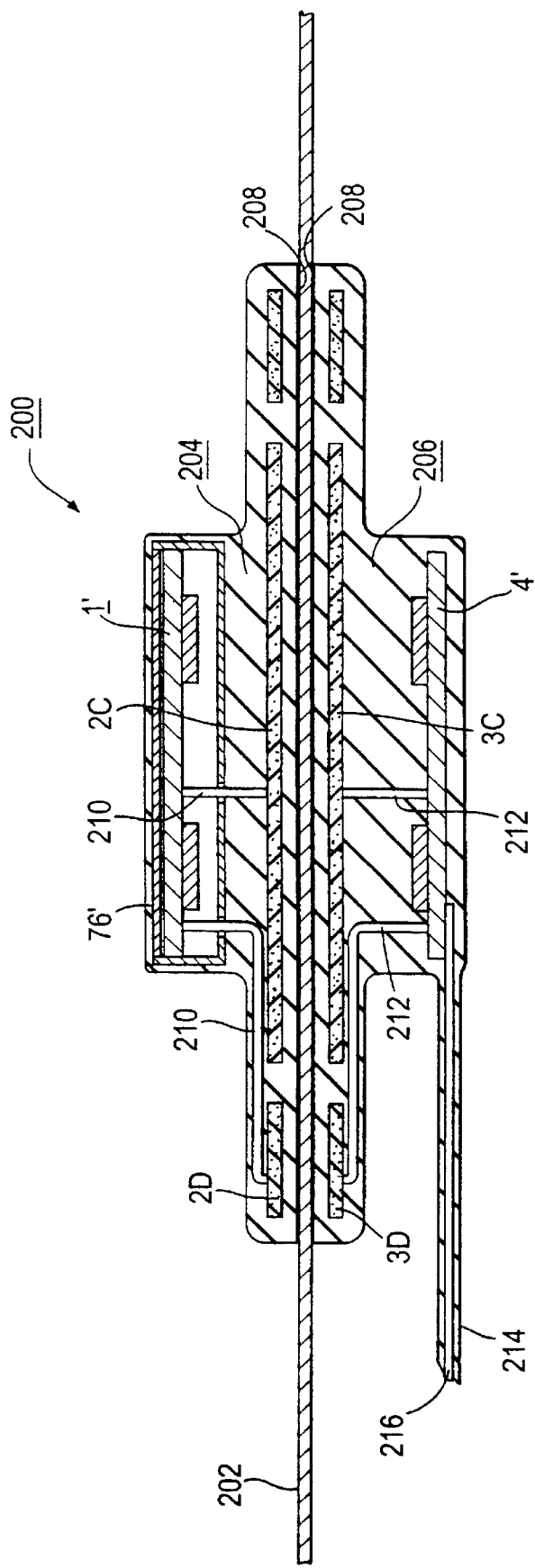
FIG. 19 shows a schematic cross-sectional view of parts of a rigid inflatable boat, for use in explaining application of pressure measurement apparatus embodying the present invention to such a boat.

FIG. 19 shows an example of the possible arrangement of the pressure sensing apparatus for one compartment of a RIB.

The compartment 200 is bounded by a membrane 202 which has, attached to its inside, a first flexible waterproof patch 204, and attached to its outside a second flexible waterproof patch 206. Each patch is attached to the membrane 202 by a thin layer of adhesive material 208. Each patch is in the form of an insulating rubber moulding and is approximately 75 mm in diameter and 10 mm thick at the centre.

The first patch contains a sensor module 1', generally similar in construction to the sensor module described previously with reference to FIGS. 7 to 9. However, in this case, the externally-threaded base portion is omitted to leave the sensor module 1' in the form of a disc. The first patch 204 further comprises two antennae 2C and 2D. The antenna 2C is in the form of a central disc. The antenna 2D is annular and extends around the circumference of the antenna 2C. Each of the antennae 2C and 2D is made of conductive rubber material. Internal connection wires 210 connect the sensor module 1' to the electrodes 2C and 2D. The connection wire 210 connecting the sensor module to the electrode 2D may be connected (e.g. by welding) to the sensor module casing if the sensor module casing is connected electrically to one of the plates of the sensor-module capacitor (as in FIG. 9). This avoids the need for a hole in the casing for the connection wire to pass through.

The sensor module 1' includes a pressurised chamber contained under a conducting diaphragm 76', as described above in relation to FIG. 9. The diaphragm 76' is covered by a thin section of the rubber moulding of the first patch 204 for environmental protection. This thin section is of negligible stiffness relative to the diaphragm 76' itself so that the internal pressure in the compartment 200 is transmitted through to the diaphragm 76'.

The second patch 206 includes a relay module 4', antennae 3C and 3D identical respectively to the antennae 2C and 2D in the first patch 204, and internal connection wires 212 connecting the relay module 4' to the antennae 3C and 3D. The antennae 3C and 3D in the second patch 206 are also made of conductive rubber. The second patch 206 has an integrally-formed cable exit portion 214 through which an external connection wire 216 extends, connecting the relay module to a display module (not shown) in the cockpit.

The annular antennae 2D and 3D are used for the earth return. As these wholly surround their corresponding signal-path antennae 2C and 3C, stray capacitance loading is kept to a minimum even under wet conditions, which can occur both inside and outside the compartment 200.

Because each patch is fully moulded in rubber, it can be flexible enough to move with the membrane 202. Access to the interior of the compartment 200 can be gained through the valve attachment (not shown) which is usually large in order to spread loading across the membrane. Thus, the apparatus can be retrofitted to any vessel.

Unlike a tyre, there is no substantial heating of the air within the compartment 200 in use, so that the compartment will remain substantially at ambient temperature. Accordingly, temperature correction is probably not required.

Atmospheric pressure changes may, however, be more significant as the internal pressure is only approximately 25% above atmospheric pressure. Atmospheric pressure changes can be compensated for at the display module by incorporating an additional sensor to measure atmospheric pressure. Pressure sensitivity to a resolution of 0.05 bar can readily be accomplished over the range of pressures used.

As described above, the present invention can provide signal transmission apparatus comprising:
  transmitter circuitry comprising a resonator having at least one component whose effective value influences a natural resonant frequency of the resonator and can be changed in use of the circuitry;
  an excitation unit which applies to the resonator an excitation signal having an excitation frequency, the excitation signal serving to bring about oscillations having the excitation frequency in the resonator; and
  a coupling arrangement which provides a coupling between the resonator and receiver circuitry of the apparatus, the receiver circuitry being operable to detect such a change in the effective value via the coupling;
  wherein the excitation frequency is a predetermined excitation frequency that does not change when the effective value changes and that differs from each value of the natural resonant frequency of the resonator means as the effective value changes in use of the transmitter circuitry.

Preferably, the excitation frequency is chosen such that at the excitation frequency an impedance of the resonator compensates for a reactance of the coupling and a source impedance of the excitation unit.

In one embodiment the excitation frequency is chosen such that, in response to such a change in the effective value, a load current drawn by the resonator changes proportionately more than a load voltage produced across the resonator.

The excitation frequency may be chosen such that, in response to such a change in the effective value, there is no detectable change in a load voltage produced across the resonator.

In one embodiment, in use of the apparatus, the resonator has a current-frequency characteristic that includes a frequency band bounded by a first frequency at which there is a current maximum in the characteristic and by a second frequency at which there is a current minimum in the characteristic, and the excitation frequency is chosen to be within that frequency band.

In another embodiment, in use of the apparatus, the resonator has a current-frequency characteristic that includes a frequency band bounded by a first frequency at which there is a current maximum in the characteristic and by a second frequency at which there is a current minimum in the characteristic. Outside that frequency band there are respective upper and lower reverse frequencies, at each of which the effect on a load current drawn by the resonator of such a change in the effective value is reversed. The upper reverse frequency is higher than the greater of the first and second frequencies. The lower reverse frequency is lower than the lesser of the first and second frequencies. The excitation frequency is chosen to be in a frequency range from the lower reverse frequency to the upper reverse frequency.

The coupling may be a reactive coupling.

The coupling may comprise a wireless coupling portion.

In one embodiment the coupling comprises a capacitive coupling portion, and the excitation frequency is less than the natural resonant frequency, preferably greater than 0.8 times the natural resonant frequency.

The capacitive coupling portion may comprise a first antenna coupled to the resonator, and a second antenna, opposed to the first antenna and coupled to the receiver circuitry. Preferably, each of the antennae comprises a conducting surface, and the opposed antennae are separated by a gap.

One or each conducting surface may be covered by a layer of insulating material.

In another embodiment the coupling is made up of a hard-wire coupling portion and an inductive coupling portion. In this case the excitation frequency is preferably higher than the natural resonant frequency.

Preferably, the resonator and the receiver circuitry have a further coupling, in addition to the coupling mentioned above, providing a return path therebetween.

The further coupling also may comprise a capacitive coupling portion provided by a third antenna coupled to the resonator and a fourth antenna, opposed to the third antenna and coupled to the receiver circuitry.

The further coupling may include a mechanical coupling portion.

In one embodiment the resonator has respective first and second terminals connected to the coupling arrangement, and a capacitive element of the resonator is connected between the first terminal and a node of the resonator to which the remaining elements of the resonator are connected, such that stray capacitance between the first and second terminals is connected in series with the capacitive element between the node and the second terminal.

The transmitter circuitry may comprise a modulator connected with the resonator and operable to change the effective value in dependence upon a control signal or operable to cause the effective value to change in dependence upon each one in turn of a plurality of control signals on a predetermined time-division-multiplexing basis.

In one embodiment the plurality of control signals are allocated respective time periods in a predetermined sequence and the transmitter circuitry comprises synchronising circuitry which inserts, between successive such predetermined sequences, a preselected synchronising signal for use in the receiver circuitry in demultiplexing the control signals.

In another embodiment the transmitter circuitry further comprises a sub-carrier oscillator which produces a sub-carrier oscillation signal, lower in frequency than the excitation frequency, that is modulated in dependence upon the or each the control signal, the effective value being changed in dependence upon the sub-carrier oscillation signal. The sub-carrier oscillation signal may be frequency-modulated in dependence upon the or each the control signal.

Preferably, the transmitter circuitry further comprises disabling circuitry which inhibits production of the control signal when the voltage produced by resonator falls below a minimum operating value.

The disabling circuitry may determine the minimum operating value in dependence upon ambient temperature and/or in dependence upon a measurement of the gate threshold voltage of a representative transistor included in the transmitter circuitry.

In one embodiment the receiver circuitry comprises:
  a modulator which amplitude-modulates the excitation signal in dependence upon a further signal to be transmitted from the receiver circuitry to further circuitry, separate from the transmitter circuitry, that is also coupled to the receiver circuitry; and
  a demodulator which demodulates a sensing signal, derived from the resonator in the transmitter circuitry, with the further signal so as to tend to cancel out from the sensing signal variations arising from the amplitude modulation of the excitation signal, the demodulated sensing signal being used to detect the change in the effective value.

The present invention can also provide tyre pressure measuring apparatus, adapted to be carried by a vehicle, including signal transmission apparatus provided with the sensor as described above, the transmitter circuitry being adapted to be carried by one of the vehicle wheels and the receiver circuitry being adapted to be carried by a chassis of the vehicle, and the one or more predetermined parameters sensed by the sensor means including a tyre pressure of the one wheel.

In one embodiment the transmitter circuitry comprises a pressure sensor which measures pressure and a temperature sensor, independent of the pressure sensing means, which measures tyre temperature, and combining circuitry connected with the pressure sensor and the temperature sensor. The combining circuitry combines the measurement results of those sensors such that the control signal varies according to a predetermined function of the ratio between the measured tyre pressure and the measured tyre temperature.

The pressure sensor may comprise a capacitive pressure sensing element in parallel with a trimming capacitor.

The temperature sensor may comprise a thermistor in a resistor network.

The thermistor preferably has a negative temperature co-efficient.

In one embodiment the combining circuitry comprises an RC oscillator including the pressure sensor in its capacitive element and including the temperature sensor in its resistive element.

One side of the capacitive element is preferably connected to ground potential.

The RC oscillator may comprise a logical RC oscillator having:
  a first output node at which a non-inverted output signal is produced in use of the oscillator;
  a second output node at which an inverted output signal is produced in use of the oscillator;
  a timing node;
  one or more resistive elements connected between the timing node and the second output node;
  one or more capacitive elements connected between the timing node and a node that is maintained at a fixed potential in use of the oscillator;

a divider having respective first and second portions connected in series between the timing node and the first output node; and feedback circuitry connected for deriving a feedback signal, applied to an input of the oscillator, from a common node at which the first and second portions of the divider are connected together.

At least one of the first and second antennae may be in the form of the frustum of a cone. Preferably, at least one of the first and second antennae subtends an angle less than 360° on the one wheel.

The first antenna may be adapted to be located under an inner rim of the one wheel.

The pressure sensor may have first and second mutually-opposed electrodes having a dielectric therebetween, at least one of the two electrodes being adapted to deflect towards the other electrode when the sensor is subject to an applied pressure such that the capacitance between the electrodes changes with the applied pressure.

At least one of the two electrodes may form part of a casing of the sensor.

The pressure sensor may further comprise a printed circuit board having electronic components mounted on one side thereof and also having one of the electrodes printed on the other side thereof.

Preferably, substantially all external surfaces of the pressure sensor are made of conductive material.

The pressure sensor and the transmitter circuitry are preferably integrated together in a sensor module adapted to be carried by the one wheel.

In one embodiment, the receiver circuitry comprises first and second modules connected together by a hard-wire link through which a current flows between the two modules when the apparatus is in use, the first module comprising a current modulator which modulates that current in dependence upon the detected change in the effective value, and the second module comprising a current detector which detects such modulation of that current by the current modulator in the first module.

The current may be modulated digitally between respective low and high values in accordance with the detected changes in the effective value.

At least one of the low and high values may be dependent upon a further signal that is independent of those detected changes in the effective value.

For example, the further signal is derived from a temperature sensor arranged to sense ambient temperature.

In one embodiment the receiver circuitry comprises gauge pressure determining circuitry which determines a gauge tyre pressure $P_g$ for the one wheel based on $$P_g = P/T \cdot T_a - P_a$$

where P and T are the absolute pressure and absolute temperature sensed by the sensor and transmitted by the transmitter circuitry to the receiver circuitry, and $P_a$ and $T_a$ are the atmospheric pressure and temperature respectively.

What is claimed is:

1. Signal transmission apparatus comprising:

transmitter circuitry comprising a resonator having at least one component whose effective value influences a natural resonant frequency of the resonator and can be changed in use of the circuitry;

an excitation unit which applies to the resonator an excitation signal having an excitation frequency, said excitation signal serving to bring about oscillations having said excitation frequency in said resonator;

receiver circuitry; and a coupling arrangement which provides a coupling between said resonator and said receiver circuitry, the receiver circuitry being operable to detect such a change in said effective value via said coupling;

wherein said excitation frequency is a predetermined excitation frequency that does not change when said effective value changes and that differs from each value of said natural resonant frequency of said resonator as said effective value changes in use of the transmitter circuitry.

2. Apparatus as claimed in claim 1, wherein said at least one component is a reactive component of the resonator.

3. Apparatus as claimed in claim 1, wherein said excitation unit is included in said receiver circuitry and said excitation signal is coupled to said resonator by means of said coupling.

4. Apparatus as claimed in claim 3, wherein said transmitter circuitry includes a power supply deriving circuit connected to said resonator for deriving a power supply needed for powering at least part of the transmitter circuitry from the excitation signal transmitted to the resonator by said receiver circuitry.

5. Apparatus as claimed in claim 1, wherein said coupling comprises a capacitive coupling portion.

6. Apparatus as claimed in claim 5, wherein said excitation frequency is greater than 0.8 times said natural resonant frequency and less than said natural resonant frequency.

7. Apparatus as claimed in claim 5, wherein said excitation frequency is in the range from 0.85 to 0.97 times said natural resonant frequency.

8. Apparatus as claimed in claim 5, wherein said capacitive coupling portion comprises a first antenna coupled to said resonator, and a second antenna, opposed to said first antenna and coupled to said receiver circuitry, each of said first and second antennas comprising a conducting surface, and the first and second antennas being separated by a gap.

9. Apparatus as claimed in claim 1, wherein said coupling comprises an inductive coupling portion.

10. Apparatus as claimed in claim 9, wherein said excitation frequency is higher than said natural resonant frequency.

11. Apparatus as claimed in claim 1, wherein said receiver circuitry is operable to detect a change in the current drawn by the resonator brought about by said change in said effective value.

12. Apparatus as claimed in claim 1, wherein said transmitter circuitry comprises a sensor which senses one or more predetermined parameters, and said change in said effective value is brought about by a change in at least one of said predetermined parameters.

13. Apparatus as claimed in claim 1, wherein said transmitter circuitry comprises a modulator connected with said resonator and operable to change said effective value in dependence upon a control signal.

14. Apparatus as claimed in claim 13, wherein said control signal is an oscillation signal of variable frequency, and said receiver circuitry is operable to determine the control-signal frequency by detecting the frequency of change of said effective value.

15. Apparatus as claimed in claim 13, wherein said modulator comprises a field-effect transistor having its gate connected operatively to said resonator means and also having either its source or drain connected to receive said control signal, said field-effect transistor being maintained in a non-conducting state such that its gate capacitance is changed by changes in the control-signal potential.

16. Apparatus as claimed in claim 1, wherein:
said receiver circuitry comprises a modulator which amplitude-modulates said excitation signal in dependence upon a further signal to be transmitted from the receiver circuitry to said transmitter circuitry; and
said transmitter circuitry comprises an amplitude detector which detects said further signal based on the amplitude of the excitation signal received thereby.

17. Apparatus as claimed in claim 16, wherein said receiver circuitry further comprises a demodulator which demodulates a sensing signal, derived from the resonator in the transmitter circuitry, with said further signal so as to tend to cancel out from said sensing signal variations arising from the amplitude modulation of the excitation signal, the demodulated sensing signal being used to detect said change in said effective value.

18. Sensing apparatus, for transmitting sensor data from a first lenient to a second element, the first and second elements being movable relative to one another, which apparatus comprises:
transmitter circuitry adapted to be carried by the first element and comprising:
a resonator having at least one component whose effective value influences a natural resonant frequency of the resonator and can be changed in use of the circuitry; and
a sensor which senses one or more predetermined parameters, such a change in said effective value being brought about by a change in at least one of said predetermined parameters;
an excitation unit which applies to the resonator an excitation signal having an excitation frequency, said excitation signal serving to bring about oscillations having said excitation frequency in said resonator;
receiver circuitry adapted to be carried by the second element, and a coupling arrangement which provides a coupling between said resonator and said receiver circuitry, the receiver circuitry being operable to detect said change in said effective value via said coupling;
wherein said excitation frequency is a predetermined excitation frequency that does not change when said effective value changes and that differs from each value of said natural resonant frequency of said resonator as said effective value changes in use of the transmitter circuitry.

19. Tyre pressure measuring apparatus, adapted to be carried by a vehicle, comprising:
transmitter circuitry adapted to be carried by one of the vehicle wheels and comprising:
a resonator having at least one component whose effective value influences a natural resonant frequency of the resonator and can be changed in use of the circuitry; and
a sensor which senses a tyre pressure of said one wheel, such a change in said effective value being brought about by a change in said tyre pressure;
an excitation unit which applies to the resonator an excitation signal having an excitation frequency, said excitation signal serving to bring about oscillations having said excitation frequency in said resonator;
receiver circuitry adapted to be carried by a chassis of the vehicle; and
a coupling arrangement which provides a coupling between said resonator and said receiver circuitry, the receiver circuitry being operable to detect said change in said effective value via said coupling;
wherein said excitation frequency is a predetermined excitation frequency that does not change when said effective value changes and that differs from each value of said natural resonant frequency of said resonator as said effective value changes in use of the transmitter circuitry.

20. Apparatus as claimed in claim 19, wherein:
the transmitter circuitry comprises a pressure sensor which measures pressure and a temperature sensor, independent of the pressure sensor, which measures tyre temperature;
said pressure sensor has a capacitance $C_p$ that varies with absolute tyre pressure P, at least in a desired operating range of pressures of the pressure sensor, approximately in accordance with $$C_p = k_p \cdot P^\phi$$

where $k_p$ and $\phi$ are constants;
the temperature sensor has a resistance $R_t$ that varies with absolute tyre temperature T, at least in a desired operating range of temperatures of the temperature sensor, approximately in accordance with $$R_t = K_t \cdot T^{-\psi}$$

where $k_t$ is a constant; and
said transmitter circuitry combines the measurement results of those sensors such that said effective value varies in dependence upon the product $R_t C_p$ of said pressure-sensor capacitance $C_p$ and the temperature-sensor resistance $R_t$.

21. Apparatus as claimed in claim 19, wherein said receiver circuitry comprises first and second modules connected together by a hard-wire link through which a current flows between the two modules when the apparatus is in use, the first module comprising a current modulator which modulates said current in dependence upon the detected change in said effective value, and said second module comprising a current detector which detects such modulation of said current by said current modulator in the first module.

22. A signal transmission method, for use with transmitter circuitry that comprises a resonator having at least one component whose effective value influences a natural resonant frequency of the resonator, and with receiver circuitry that has a coupling when in use to said resonator, the method comprising:
applying to the resonator an excitation signal having an excitation frequency so that oscillations having said excitation frequency are brought about in said resonator;
bringing about a change in said effective value of said at least one component in the transmitter circuitry; and
detecting such a change in said effective value in the receiver circuitry via said coupling;
wherein said excitation frequency is a predetermined excitation frequency that does not change when said effective value changes and that differs from each value of said natural resonant frequency of said resonator as said effective value changes in use of the transmitter circuitry.

* * * * *